US012647970B2

(12) United States Patent (10) Patent No.: US 12,647,970 B2
Sakhnini et al. (45) Date of Patent: Jun. 2, 2026

(54) MULTIPLE CHANNELS WITHIN CONFIGURED GRANT OCCASIONS

(71) Applicant: QUALCOMM Incorporated, San Diego, CA (US)

(72) Inventors: Iyab Issam Sakhnini, San Diego, CA (US); Olufunmilola Omolade Awoniyi-Oteri, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 18/184,310

(22) Filed: Mar. 15, 2023

(65) Prior Publication Data

US 2023/0354315 A1 Nov. 2, 2023

Related U.S. Application Data

(60) Provisional application No. 63/363,933, filed on Apr. 29, 2022, provisional application No. 63/363,931, filed on Apr. 29, 2022.

(51) Int. Cl.
 *H04W 72/1268* (2023.01)
 *H04W 72/542* (2023.01)
(52) U.S. Cl.
 CPC ..... *H04W 72/1268* (2013.01); *H04W 72/542* (2023.01)
(58) Field of Classification Search
 None
 See application file for complete search history.

(56) References Cited

U.S. PATENT DOCUMENTS

| | | | | |
|---|---|---|---|---|
| 12,294,962 B2 * | 5/2025 | Tsai | ...................... | H04L 5/0085 |
| 2021/0352684 A1 * | 11/2021 | Sakhnini | ............... | H04L 1/1854 |
| 2021/0400714 A1 * | 12/2021 | Huang | .................. | H04W 72/23 |
| 2022/0095313 A1 * | 3/2022 | Kim | ...................... | H04L 1/1883 |
| 2022/0124707 A1 * | 4/2022 | Bae | .................. | H04W 72/0446 |
| 2022/0217644 A1 * | 7/2022 | Kung | ................. | H04W 52/365 |
| 2022/0330317 A1 * | 10/2022 | Lee | ...................... | H04W 76/20 |

(Continued)

FOREIGN PATENT DOCUMENTS

| | | |
|---|---|---|
| WO | 2021187759 A1 | 9/2021 |
| WO | 2022047447 | 3/2022 |

OTHER PUBLICATIONS

Apple Inc: "Views on enhancements for XR in Rel-18", 3GPP TSG RAN WG1 #107-e, R1-2111903, 3rd Generation Partnership Project (3GPP), Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, XP052075158, pp. 1-11.

(Continued)

*Primary Examiner* — Otis L Thompson, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration associated with a configured grant (CG) that indicates a plurality of physical uplink shared channels (PUSCHs) within each CG occasion for the UE. Accordingly, the UE may transmit a plurality of packets across the plurality of PUSCHs within at least one CG occasion for the UE. Numerous other aspects are described.

30 Claims, 25 Drawing Sheets

(56)                  References Cited

U.S. PATENT DOCUMENTS

| | | | |
|---|---|---|---|
| 2022/0394706 A1* | 12/2022 | Bae | H04L 5/0053 |
| 2023/0027895 A1* | 1/2023 | Lin | H04W 72/232 |
| 2023/0134245 A1* | 5/2023 | Rossbach | H04W 72/11 |
| | | | 370/329 |
| 2023/0239818 A1* | 7/2023 | Tsuda | H04W 56/0015 |
| | | | 370/503 |
| 2023/0379921 A1* | 11/2023 | Awoniyi-Oteri | H04W 24/08 |
| 2024/0259871 A1* | 8/2024 | Wang | H04W 72/231 |
| 2024/0365339 A1* | 10/2024 | Jung | H04W 72/232 |

OTHER PUBLICATIONS

Huawei, et al., "Transmission with Configured Grant in NR Unlicensed Band", 3GPP TSG RAN WG1 Meeting #98bis, 3GPP Draft; R1-1910048, 3rd Generation Partnership Project (3GPP), Mobile Competence Centre; 650, Route Des Lucioles; F-06921 Sophia-Antipolis Cedex, France, vol. RAN WG1, No. Chongqing, China, Oct. 14, 2019-Oct. 20, 2019, Oct. 8, 2019, XP051788855, 22 Pages, XP051809062, p. 14, line 4-p. 18, figure 10, table 1, paragraphs 2.1.2, 2.2, 2.4, 3.1.1 to 3.1.2.

International Search Report and Written Opinion—PCT/US2023/064568—ISA/EPO—Jun. 2, 2023.

Moderator (Vivo) : "Summary of [104-e-NR-7.1CRs-01] Discussion on UL skipping for PUSCH for Rel-16", 3GPP TSG RAN WG1 #104-e, R1-2102246, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Feb. 8, 2021, XP051977808, pp. 1-45.

Qualcomm Incorporated: "Capacity Enhancement Techniques for XR", 3GPP TSG RAN WG1 #109-e, R1-2205056, 3rd Generation Partnership Project (3GPP), Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052191717, pp. 1-11.

* cited by examiner

400

XR headset
with on-device processing

On-device
adjustment to
latest pose

Uplink: Tracking/Inputs

Ex: 100 bytes every 2 ms (500 Hz)
can be reduced to align with video frame rate

Downlink: Encoded data

100+ KB at 45/60/75/90 frames per second
(every 11, 13, 16, 22 ms)

gNB

Edge cloud
with game rendering

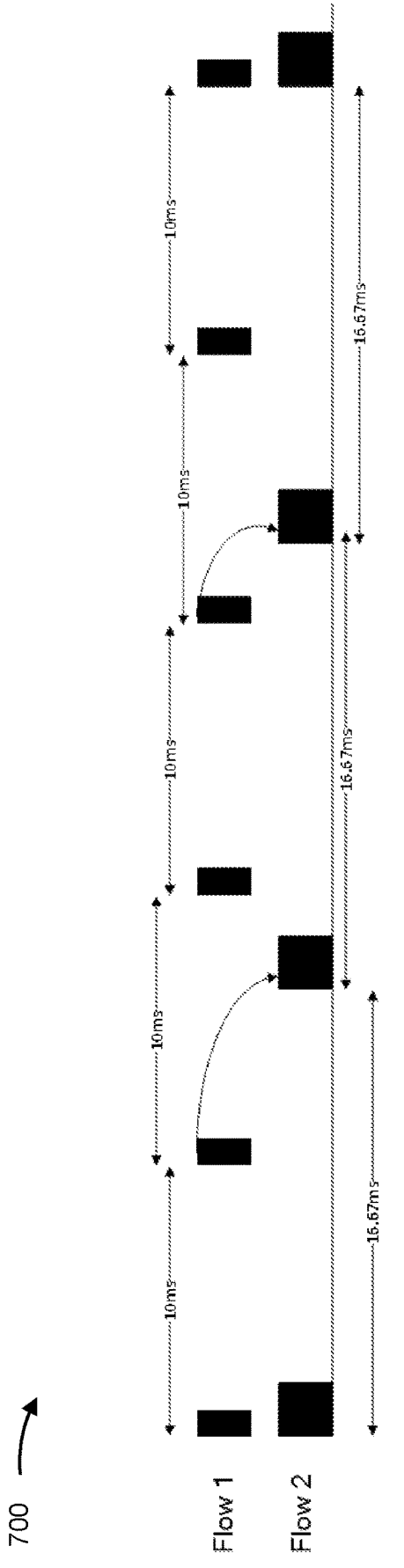
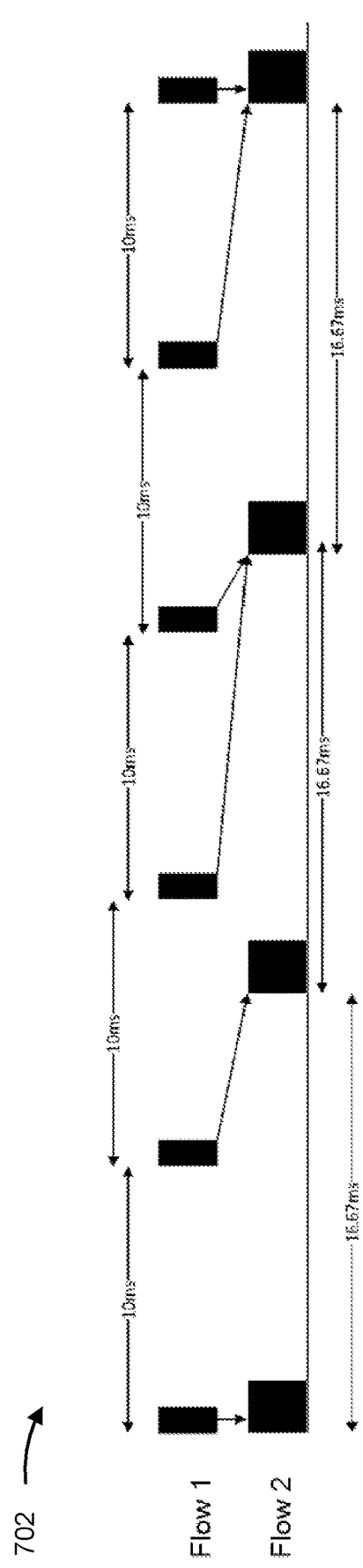
FIG. 7

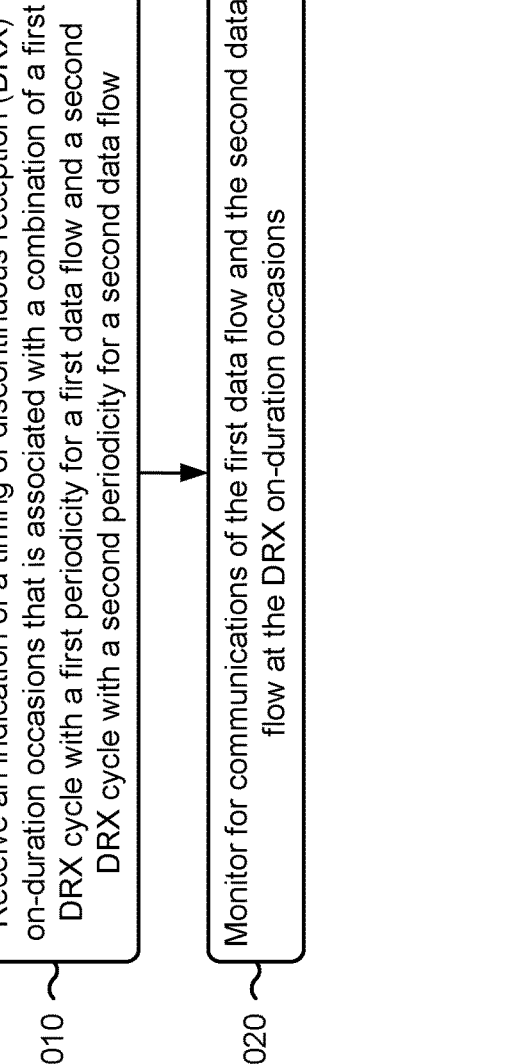

Receive an indication of a timing of discontinuous reception (DRX) on-duration occasions that is associated with a combination of a first DRX cycle with a first periodicity for a first data flow and a second DRX cycle with a second periodicity for a second data flow

1010

Monitor for communications of the first data flow and the second data flow at the DRX on-duration occasions

1110 Transmit an indication of a timing of DRX on-duration occasions that is associated with a combination of a first DRX cycle with a first periodicity for a first data flow and a second DRX cycle with a second periodicity for a second data flow 1120 Transmit communications of the first data flow and the second data flow at the DRX on-duration occasions

1100

Receive an indication of a timing of DRX on-duration occasions that is associated with a greater of a first periodicity of a first DRX cycle for a first data flow or a second periodicity of a second DRX cycle for a second data flow

1210

Monitor for communications of the first data flow and the second data flow at the DRX on-duration occasions

1220

1200

1310 — Transmit an indication of a timing of DRX on-duration occasions that is associated with a greater of a first periodicity of a first DRX cycle for a first data flow or a second periodicity of a second DRX cycle for a second data flow 1320 — Transmit communications of the first data flow and the second data flow at the DRX on-duration occasions

1300

2010 — Receive a configuration associated with SPS that indicates a plurality of PDSCHs within each SPS occasion 2020 — Receive a plurality of packets across the plurality of PDSCHs within at least one SPS occasion

2000

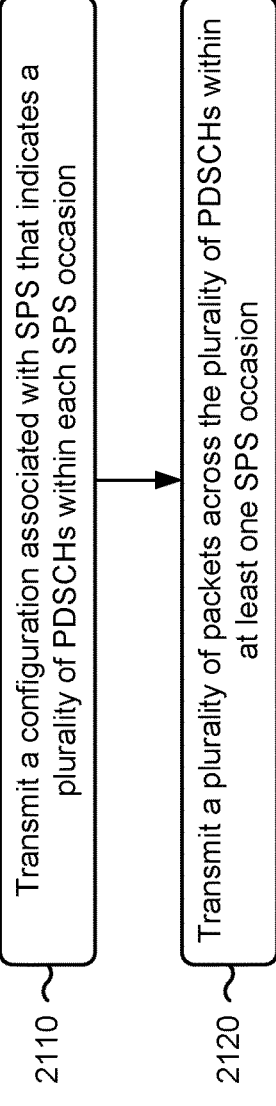
2110 — Transmit a configuration associated with SPS that indicates a plurality of PDSCHs within each SPS occasion
2120 — Transmit a plurality of packets across the plurality of PDSCHs within at least one SPS occasion
2100
FIG. 21

2210   Receive a configuration associated with a CG that indicates a plurality of PUSCHs within each CG occasion 2220   Transmit a plurality of packets across the plurality of PUSCHs within at least one CG occasion

2200

2310 Transmit a configuration associated with a CG that indicates a plurality of PUSCHs within each CG occasion 2320 Receive a plurality of packets across the plurality of PUSCHs within at least one CG occasion

2300

MULTIPLE CHANNELS WITHIN CONFIGURED GRANT OCCASIONS

CROSS-REFERENCE TO RELATED APPLICATIONS

This Patent Applications claims priority to U.S. Provisional Patent Application No. 63/363,931, filed on Apr. 29, 2022, entitled "DISCONTINUOUS RECEPTION FOR MULTIPLE DATA FLOWS," and to U.S. Provisional Patent Application No. 63/363,933, filed on Apr. 29, 2022, entitled "MULTIPLE CHANNELS WITHIN SEMI-PERSISTENT SCHEDULING OCCASIONS AND CONFIGURED GRANT OCCASIONS," and assigned to the assignee hereof. The disclosures of the prior Applications are considered part of and are incorporated by reference into this Patent Applications.

FIELD OF THE DISCLOSURE

Aspects of the present disclosure generally relate to wireless communication and to techniques and apparatuses for using multiple channels for configured grant occasions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration associated with a configured grant (CG) that indicates a plurality of physical uplink shared channels (PUSCHs) within each CG occasion for the UE. The method may include transmitting a plurality of packets across the plurality of PUSCHs within at least one CG occasion for the UE.

Some aspects described herein relate to an apparatus for wireless communication at a UE. The apparatus may include a memory and one or more processors coupled to the memory. The one or more processors may be configured to receive a configuration associated with a CG that indicates a plurality of PUSCHs within each CG occasion for the UE. The one or more processors may be further configured to transmit a plurality of packets across the plurality of PUSCHs within at least one CG occasion for the UE.

Some aspects described herein relate to a non-transitory computer-readable medium that stores a set of instructions for wireless communication by a UE. The one or more instructions, when executed by one or more processors of the UE, may cause the UE to receive a configuration associated with a CG that indicates a plurality of PUSCHs within each CG occasion for the UE. The one or more instructions, when executed by one or more processors of the UE, may further cause the UE to transmit a plurality of packets across the plurality of PUSCHs within at least one CG occasion for the UE.

Some aspects described herein relate to an apparatus for wireless communication. The apparatus may include means for receiving a configuration associated with a CG that indicates a plurality of PUSCHs within each CG occasion for the apparatus. The apparatus may further include means for transmitting a plurality of packets across the plurality of PUSCHs within at least one CG occasion for the apparatus.

Some aspects described herein relate to a method of wireless communication performed by a network entity. The method may include transmitting a configuration associated with a CG that indicates a plurality of PUSCHs within each CG occasion for a UE. The method may include receiving a plurality of packets across the plurality of PUSCHs within at least one CG occasion for the UE.

Some aspects described herein relate to an apparatus for wireless communication at a network entity. The apparatus may include a memory and one or more processors coupled to the memory. The one or more processors may be configured to transmit a configuration associated with a CG that indicates a plurality of PUSCHs within each CG occasion for a UE. The one or more processors may be further configured to receive a plurality of packets across the plurality of PUSCHs within at least one CG occasion for the UE.

Some aspects described herein relate to a non-transitory computer-readable medium that stores a set of instructions for wireless communication by a network entity. The one or more instructions, when executed by one or more processors of the network entity, may cause the network entity to transmit a configuration associated with a CG that indicates a plurality of PUSCHs within each CG occasion for a UE. The one or more instructions, when executed by one or more processors of the network entity, may further cause the network entity to receive a plurality of packets across the plurality of PUSCHs within at least one CG occasion for the UE.

Some aspects described herein relate to an apparatus for wireless communication. The apparatus may include means for transmitting a configuration associated with a CG that indicates a plurality of PUSCHs within each CG occasion for a UE. The apparatus may further include means for receiving a plurality of packets across the plurality of PUSCHs within at least one CG occasion for the UE.

Some aspects described herein relate to a method of wireless communication performed by a UE. The method may include receiving a configuration associated with semi-persistent scheduling (SPS) that indicates a plurality of physical downlink shared channels (PDSCHs) within each SPS occasion for the UE. The method may include receiving a plurality of packets across the plurality of PDSCHs within at least one SPS occasion for the UE.

Some aspects described herein relate to an apparatus for wireless communication at a UE. The apparatus may include a memory and one or more processors coupled to the memory. The one or more processors may be configured to receive a configuration associated with SPS that indicates a plurality of PDSCHs within each SPS occasion for the UE. The one or more processors may be further configured to receive a plurality of packets across the plurality of PDSCHs within at least one SPS occasion for the UE.

Some aspects described herein relate to a non-transitory computer-readable medium that stores a set of instructions for wireless communication by a UE. The one or more instructions, when executed by one or more processors of the UE, may cause the UE to receive a configuration associated with SPS that indicates a plurality of PDSCHs within each SPS occasion for the UE. The one or more instructions, when executed by one or more processors of the UE, may further cause the UE to receive a plurality of packets across the plurality of PDSCHs within at least one SPS occasion for the UE.

Some aspects described herein relate to an apparatus for wireless communication. The apparatus may include means for receiving a configuration associated with SPS that indicates a plurality of PDSCHs within each SPS occasion for the apparatus. The apparatus may further include means for receiving a plurality of packets across the plurality of PDSCHs within at least one SPS occasion for the apparatus.

Some aspects described herein relate to a method of wireless communication performed by a network entity. The method may include transmitting a configuration associated with SPS that indicates a plurality of PDSCHs within each SPS occasion for a UE. The method may include transmitting a plurality of packets across the plurality of PDSCHs within at least one SPS occasion for the UE.

Some aspects described herein relate to an apparatus for wireless communication at a network entity. The apparatus may include a memory and one or more processors coupled to the memory. The one or more processors may be configured to transmit a configuration associated with SPS that indicates a plurality of PDSCHs within each SPS occasion for a UE. The one or more processors may be further configured to transmit a plurality of packets across the plurality of PDSCHs within at least one SPS occasion for the UE.

Some aspects described herein relate to a non-transitory computer-readable medium that stores a set of instructions for wireless communication by a network entity. The one or more instructions, when executed by one or more processors of the network entity, may cause the network entity to transmit a configuration associated with SPS that indicates a plurality of PDSCHs within each SPS occasion for a UE. The one or more instructions, when executed by one or more processors of the network entity, may further cause the network entity to transmit a plurality of packets across the plurality of PDSCHs within at least one SPS occasion for the UE.

Some aspects described herein relate to an apparatus for wireless communication. The apparatus may include means for transmitting a configuration associated with SPS that indicates a plurality of PDSCHs within each SPS occasion for a UE. The apparatus may further include means for transmitting a plurality of packets across the plurality of PDSCHs within at least one SPS occasion for the UE.

Some aspects described herein relate to a method of wireless communication performed by a UE. The method may include receiving an indication of a timing of discontinuous reception (DRX) on-duration occasions that is associated with a combination of a first DRX cycle with a first periodicity for a first data flow and a second DRX cycle with a second periodicity for a second data flow. The method may include monitoring for communications of the first data flow and the second data flow at the DRX on-duration occasions.

Some aspects described herein relate to a method of wireless communication performed by a network entity. The method may include transmitting an indication of a timing of DRX on-duration occasions that is associated with a combination of a first DRX cycle with a first periodicity for a first data flow and a second DRX cycle with a second periodicity for a second data flow. The method may include transmitting communications of the first data flow and the second data flow at the DRX on-duration occasions.

Some aspects described herein relate to a method of wireless communication performed by a UE. The method may include receiving an indication of a timing of DRX on-duration occasions that is associated with a greater of a first periodicity of a first DRX cycle for a first data flow or a second periodicity of a second DRX cycle for a second data flow. The method may include monitoring for communications of the first data flow and the second data flow at the DRX on-duration occasions.

Some aspects described herein relate to a method of wireless communication performed by a network entity. The method may include transmitting an indication of a timing of DRX on-duration occasions that is associated with a greater of a first periodicity of a first DRX cycle for a first data flow or a second periodicity of a second DRX cycle for a second data flow. The method may include transmitting communications of the first data flow and the second data flow at the DRX on-duration occasions.

Some aspects described herein relate to a UE for wireless communication. The UE may include a memory and one or more processors coupled to the memory. The one or more processors may be configured to receive an indication of a timing of DRX on-duration occasions that is associated with a combination of a first DRX cycle with a first periodicity for a first data flow and a second DRX cycle with a second periodicity for a second data flow. The one or more processors may be configured to monitor for communications of the first data flow and the second data flow at the DRX on-duration occasions.

Some aspects described herein relate to a network entity for wireless communication. The network entity may include a memory and one or more processors coupled to the memory. The one or more processors may be configured to transmit an indication of a timing of DRX on-duration occasions that is associated with a combination of a first DRX cycle with a first periodicity for a first data flow and a second DRX cycle with a second periodicity for a second data flow. The one or more processors may be configured to transmit communications of the first data flow and the second data flow at the DRX on-duration occasions.

Some aspects described herein relate to a UE for wireless communication. The UE may include a memory and one or more processors coupled to the memory. The one or more processors may be configured to receive an indication of a timing of DRX on-duration occasions that is associated with a greater of a first periodicity of a first DRX cycle for a first data flow or a second periodicity of a second DRX cycle for a second data flow. The one or more processors may be configured to monitor for communications of the first data flow and the second data flow at the DRX on-duration occasions.

Some aspects described herein relate to a network entity for wireless communication. The network entity may include a memory and one or more processors coupled to the memory. The one or more processors may be configured to transmit an indication of a timing of DRX on-duration occasions that is associated with a greater of a first period-icity of a first DRX cycle for a first data flow or a second periodicity of a second DRX cycle for a second data flow. The one or more processors may be configured to transmit communications of the first data flow and the second data flow at the DRX on-duration occasions.

Some aspects described herein relate to a non-transitory computer-readable medium that stores a set of instructions for wireless communication by a UE. The set of instructions, when executed by one or more processors of the UE, may cause the UE to receive an indication of a timing of DRX on-duration occasions that is associated with a combination of a first DRX cycle with a first periodicity for a first data flow and a second DRX cycle with a second periodicity for a second data flow. The set of instructions, when executed by one or more processors of the UE, may cause the UE to monitor for communications of the first data flow and the second data flow at the DRX on-duration occasions.

Some aspects described herein relate to a non-transitory computer-readable medium that stores a set of instructions for wireless communication by a network entity. The set of instructions, when executed by one or more processors of the network entity, may cause the network entity to transmit an indication of a timing of DRX on-duration occasions that is associated with a combination of a first DRX cycle with a first periodicity for a first data flow and a second DRX cycle with a second periodicity for a second data flow. The set of instructions, when executed by one or more processors of the network entity, may cause the network entity to transmit communications of the first data flow and the second data flow at the DRX on-duration occasions.

Some aspects described herein relate to a non-transitory computer-readable medium that stores a set of instructions for wireless communication by a UE. The set of instructions, when executed by one or more processors of the UE, may cause the UE to receive an indication of a timing of DRX on-duration occasions that is associated with a greater of a first periodicity of a first DRX cycle for a first data flow or a second periodicity of a second DRX cycle for a second data flow. The set of instructions, when executed by one or more processors of the UE, may cause the UE to monitor for communications of the first data flow and the second data flow at the DRX on-duration occasions.

Some aspects described herein relate to a non-transitory computer-readable medium that stores a set of instructions for wireless communication by a network entity. The set of instructions, when executed by one or more processors of the network entity, may cause the network entity to transmit an indication of a timing of DRX on-duration occasions that is associated with a greater of a first periodicity of a first DRX cycle for a first data flow or a second periodicity of a second DRX cycle for a second data flow. The set of instructions, when executed by one or more processors of the network entity, may cause the network entity to transmit communications of the first data flow and the second data flow at the DRX on-duration occasions.

Some aspects described herein relate to an apparatus for wireless communication. The apparatus may include means for receiving an indication of a timing of DRX on-duration occasions that is associated with a combination of a first DRX cycle with a first periodicity for a first data flow and a second DRX cycle with a second periodicity for a second data flow. The apparatus may include means for monitoring for communications of the first data flow and the second data flow at the DRX on-duration occasions.

Some aspects described herein relate to an apparatus for wireless communication. The apparatus may include means for transmitting an indication of a timing of DRX on-duration occasions that is associated with a combination of a first DRX cycle with a first periodicity for a first data flow and a second DRX cycle with a second periodicity for a second data flow. The apparatus may include means for transmitting communications of the first data flow and the second data flow at the DRX on-duration occasions.

Some aspects described herein relate to an apparatus for wireless communication. The apparatus may include means for receiving an indication of a timing of DRX on-duration occasions that is associated with a greater of a first period-icity of a first DRX cycle for a first data flow or a second periodicity of a second DRX cycle for a second data flow. The apparatus may include means for monitoring for com-munications of the first data flow and the second data flow at the DRX on-duration occasions.

Some aspects described herein relate to an apparatus for wireless communication. The apparatus may include means for transmitting an indication of a timing of DRX on-duration occasions that is associated with a greater of a first periodicity of a first DRX cycle for a first data flow or a second periodicity of a second DRX cycle for a second data flow. The apparatus may include means for transmitting communications of the first data flow and the second data flow at the DRX on-duration occasions.

Aspects generally include a method, apparatus, system, computer program product, non-transitory computer-read-able medium, user equipment, base station, network entity, wireless communication device, and/or processing system as substantially described herein with reference to and as illustrated by the drawings and specification.

The foregoing has outlined rather broadly the features and technical advantages of examples according to the disclo-sure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a timing for multiple DRX cycles, in accordance with the present disclosure.

FIG. 10 is a diagram illustrating an example process performed, for example, by a UE, in accordance with the present disclosure.

FIGS. 20 and 21 are diagrams illustrating example processes associated with using multiple channels for SPS occasions, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
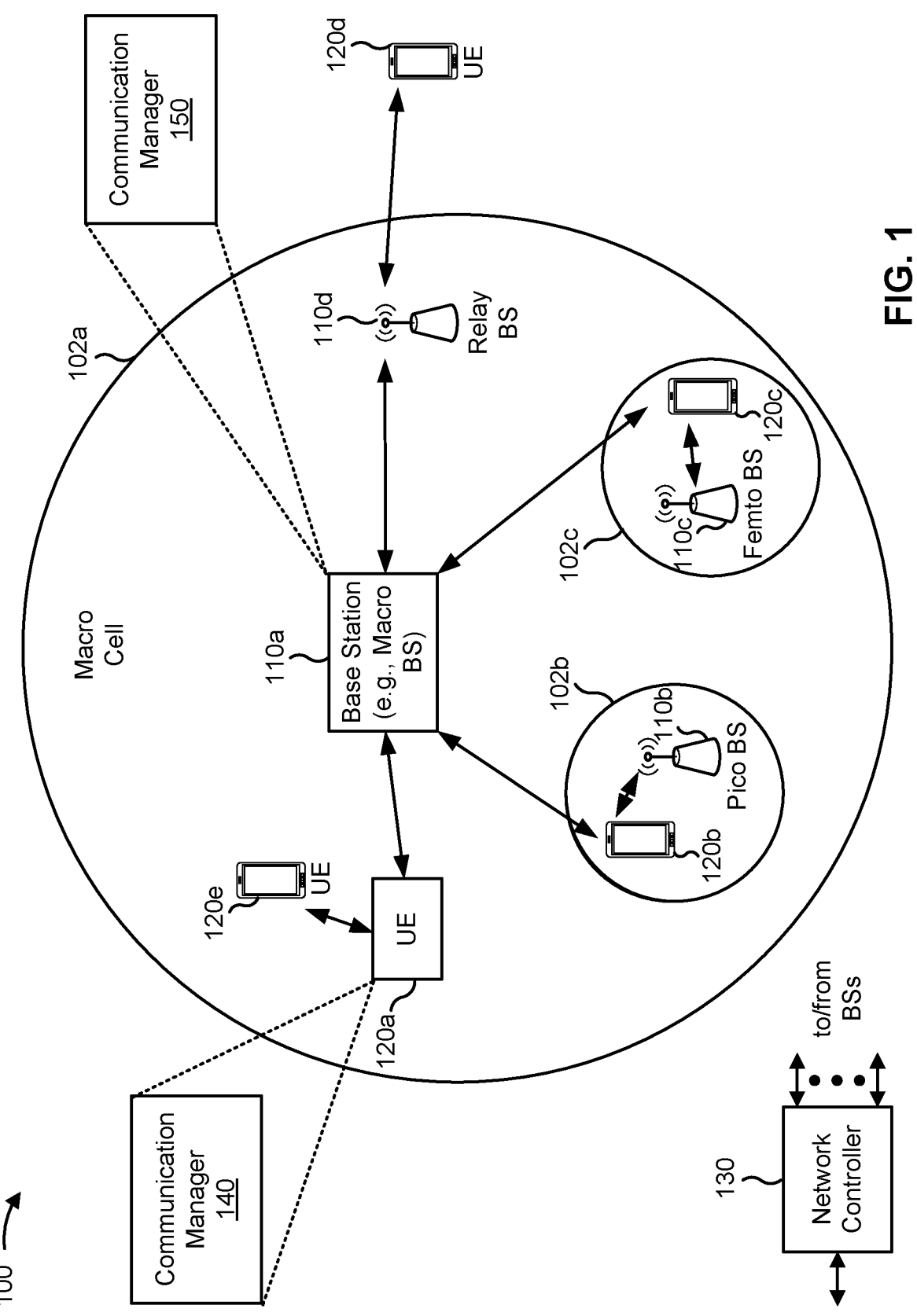
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity"

may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may receive an indication of a timing of discontinuous reception (DRX) on-duration occasions that is associated with a combination of a first DRX cycle with a first periodicity for a first data flow and a second DRX cycle with a second periodicity for a second data flow. The communication manager 140 may monitor for communications of the first data flow and the second data flow at the DRX on-duration occasions.

In some aspects, the communication manager 140 may receive an indication of a timing of DRX on-duration occasions that is associated with a greater of a first periodicity of a first DRX cycle for a first data flow or a second periodicity of a second DRX cycle for a second data flow. The communication manager 140 may monitor for communications of the first data flow and the second data flow at the DRX on-duration occasions. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit an indication of a timing of DRX on-duration occasions that is associated with a combination of a first DRX cycle with a first periodicity for a first data flow and a second DRX cycle with a second periodicity for a second data flow. The communication manager 150 may transmit communications of the first data flow and the second data flow at the DRX on-duration occasions.

In some aspects, the communication manager 150 may transmit an indication of a timing of DRX on-duration occasions that is associated with a greater of a first periodicity of a first DRX cycle for a first data flow or a second periodicity of a second DRX cycle for a second data flow. The communication manager 150 may transmit communications of the first data flow and the second data flow at the DRX on-duration occasions. Additionally, or alternatively, the communication manager 150 may perform one or more other operations described herein.

In some aspects, a UE (e.g., a UE 120) may include a communication manager 140. As described in more detail elsewhere herein, the communication manager 140 may receive a configuration associated with semi-persistent scheduling (SPS) that indicates a plurality of physical downlink shared channels (PDSCHs) within each SPS occasion for the UE 120 and receive a plurality of packets across the plurality of PDSCHs within at least one SPS occasion for the UE 120. Additionally, or alternatively, as described in more detail elsewhere herein, the communication manager 140 may receive a configuration associated with a configured grant (CG) that indicates a plurality of physical uplink shared channels (PUSCHs) within each CG occasion for the UE 120 and transmit a plurality of packets across the plurality of PUSCHs within at least one CG occasion for the UE 120. Additionally, or alternatively, the communication manager 140 may perform one or more other operations described herein.

In some aspects, a network entity (e.g., the base station 110) may include a communication manager 150. As described in more detail elsewhere herein, the communication manager 150 may transmit a configuration associated with SPS that indicates a plurality of PDSCHs within each SPS occasion for the UE 120 and transmit a plurality of packets across the plurality of PDSCHs within at least one SPS occasion for the UE 120. Additionally, or alternatively, as described in more detail elsewhere herein, the communication manager 150 may transmit a configuration associated with a CG that indicates a plurality of PUSCHs within each CG occasion for the UE 120 and receive a plurality of packets across the plurality of PUSCHs within at least one CG occasion for the UE 120. Additionally, or alternatively, the communication manager 150 may perform one or more other operations described herein.

As indicated above, FIG. 1 is provided as an example. Other examples may differ from what is described with regard to FIG. 1.

Figure 2:
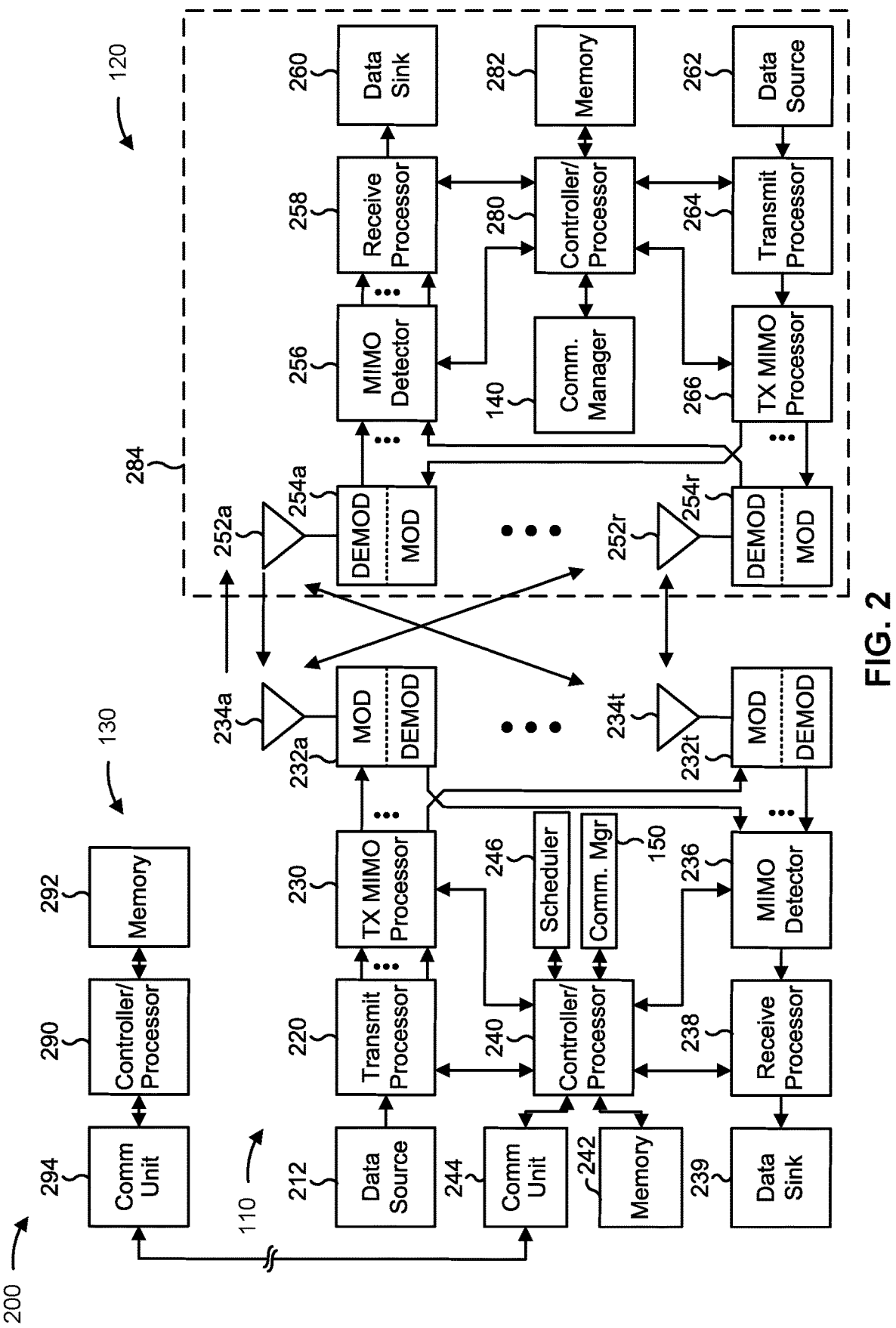
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-25).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-25).

A controller/processor of a network entity (e.g., the controller/processor 240 of the base station 110), the controller/processor 280 of the UE 120, and/or any other component(s) of FIG. 2 may perform one or more techniques associated with DRX with multiple flows, using multiple channels for SPS occasions, or using multiple channels for CG occasions, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, process 1300 of FIG. 13, process 2000 of FIG. 20, process 2100 of FIG. 21, process 2200 of FIG. 22, process 2300 of FIG. 23, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1000 of FIG. 10, process 1100 of FIG. 11, process 1200 of FIG. 12, process 1300 of FIG. 13, process 2000 of FIG. 20, process 2100 of FIG. 21, process 2200 of FIG. 22, process 2300 of FIG. 23, and/or other processes as described herein. In some examples, executing instructions may include running the instructions, converting the instructions, compiling the instructions, and/or interpreting the instructions, among other examples.

In some aspects, the UE 120 includes means for receiving an indication of a timing of DRX on-duration occasions that is associated with a combination of a first DRX cycle with a first periodicity for a first data flow and a second DRX cycle with a second periodicity for a second data flow; and/or means for monitoring for communications of the first data flow and the second data flow at the DRX on-duration occasions. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for transmitting an indication of a timing of DRX on-duration occasions that is associated with a combination of a first DRX cycle with a first periodicity for a first data flow and a second DRX cycle with a second periodicity for a second data flow; and/or means for transmitting communications of the first data flow and the second data flow at the DRX on-duration occasions. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for receiving an indication of a timing of DRX on-duration occasions that is associated with a greater of a first periodicity of a first DRX cycle for a first data flow or a second periodicity of a second DRX cycle for a second data flow; and/or means for monitoring for communications of the first data flow and the second data flow at the DRX on-duration occasions.

In some aspects, the network entity includes means for transmitting an indication of a timing of DRX on-duration occasions that is associated with a greater of a first periodicity of a first DRX cycle for a first data flow or a second periodicity of a second DRX cycle for a second data flow; and/or means for transmitting communications of the first data flow and the second data flow at the DRX on-duration occasions.

In some aspects, a UE (e.g., UE 120 and/or apparatus 2400 of FIG. 24) may include means for receiving a configuration associated with SPS that indicates a plurality of PDSCHs within each SPS occasion for the UE; and/or means for receiving a plurality of packets across the plurality of PDSCHs within at least one SPS occasion for the UE. Additionally, or alternatively, the UE may include means for receiving a configuration associated with a CG that indicates a plurality of PUSCHs within each CG occasion for the UE; and/or means for transmitting a plurality of packets across the plurality of PUSCHs within at least one CG occasion for the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 24:
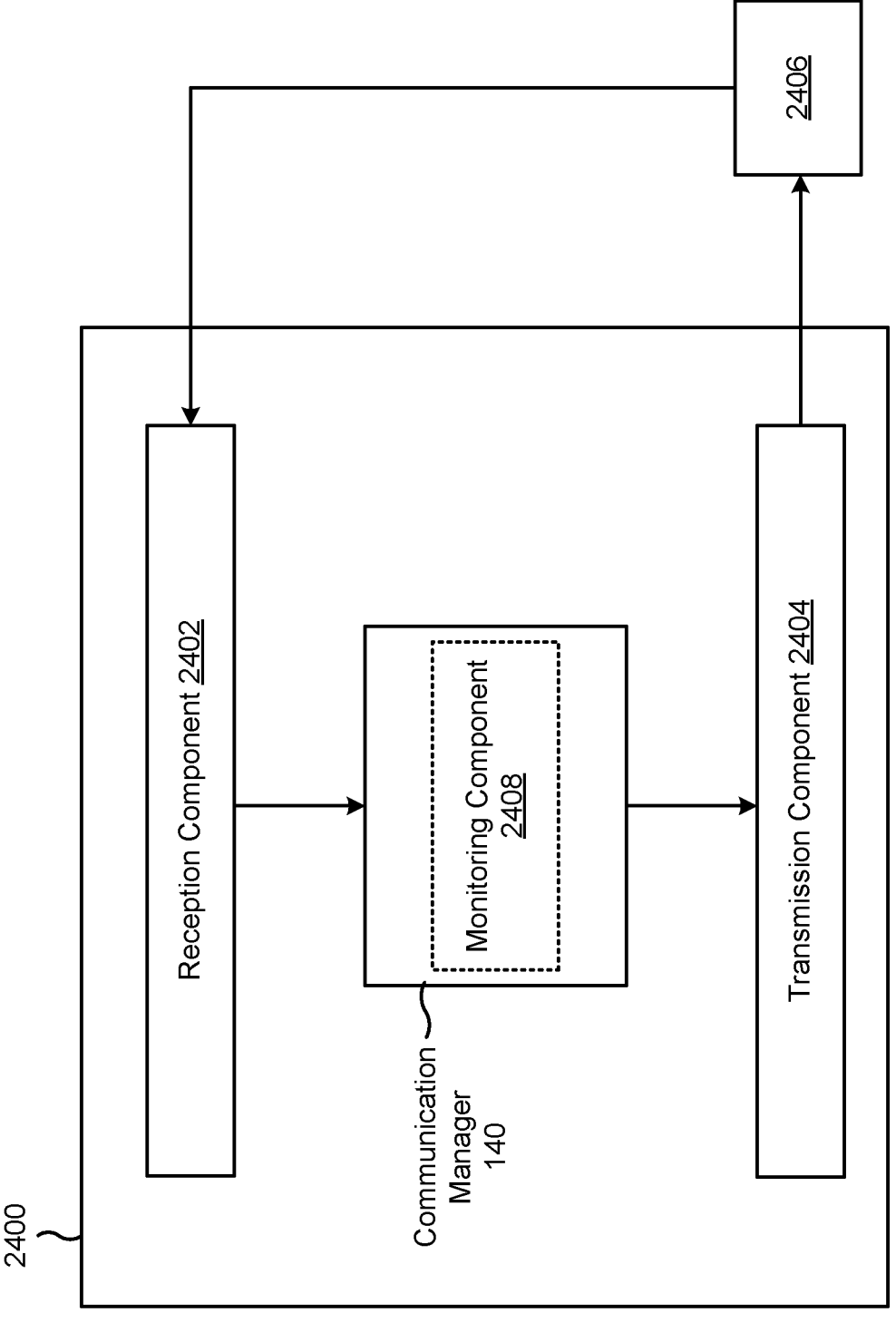
FIGS. 24 and 25 are diagrams of example apparatuses for wireless communication, in accordance with the present disclosure.
Figure 25:
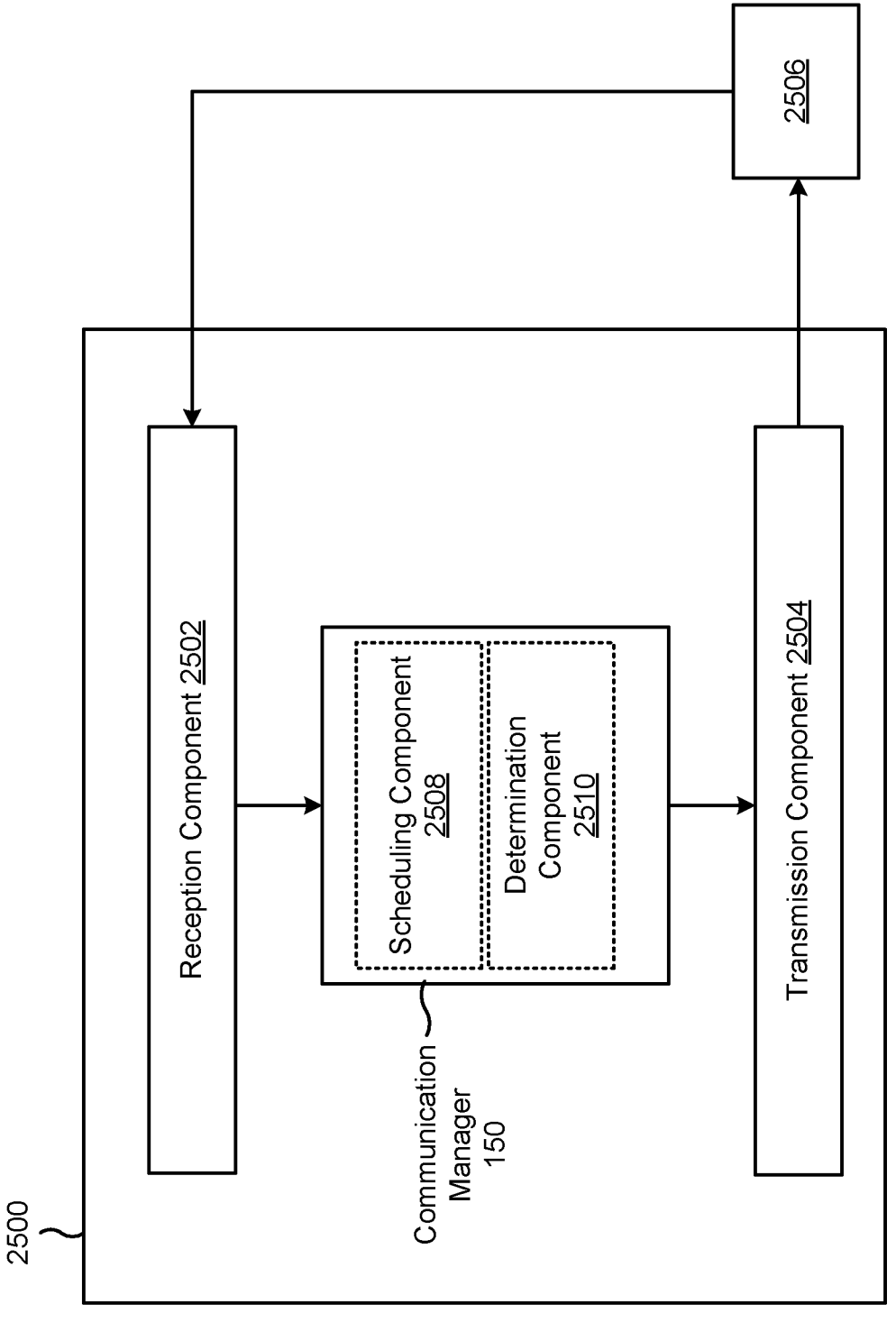

In some aspects, a network entity (e.g., base station 110, CU 310, DU 330, RU 340, and/or apparatus 2500 of FIG. 25) may include means for transmitting a configuration associated with SPS that indicates a plurality of PDSCHs within each SPS occasion for a UE (e.g., UE 120 and/or apparatus 2400 of FIG. 24); and/or means for transmitting a plurality of packets across the plurality of PDSCHs within at least one SPS occasion for the UE. Additionally, or alternatively, the network entity may include means for transmitting a configuration associated with a CG that indicates a plurality of PUSCHs within each CG occasion for a UE; and/or means for receiving a plurality of packets across the plurality of PUSCHs within at least one CG occasion for the UE. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
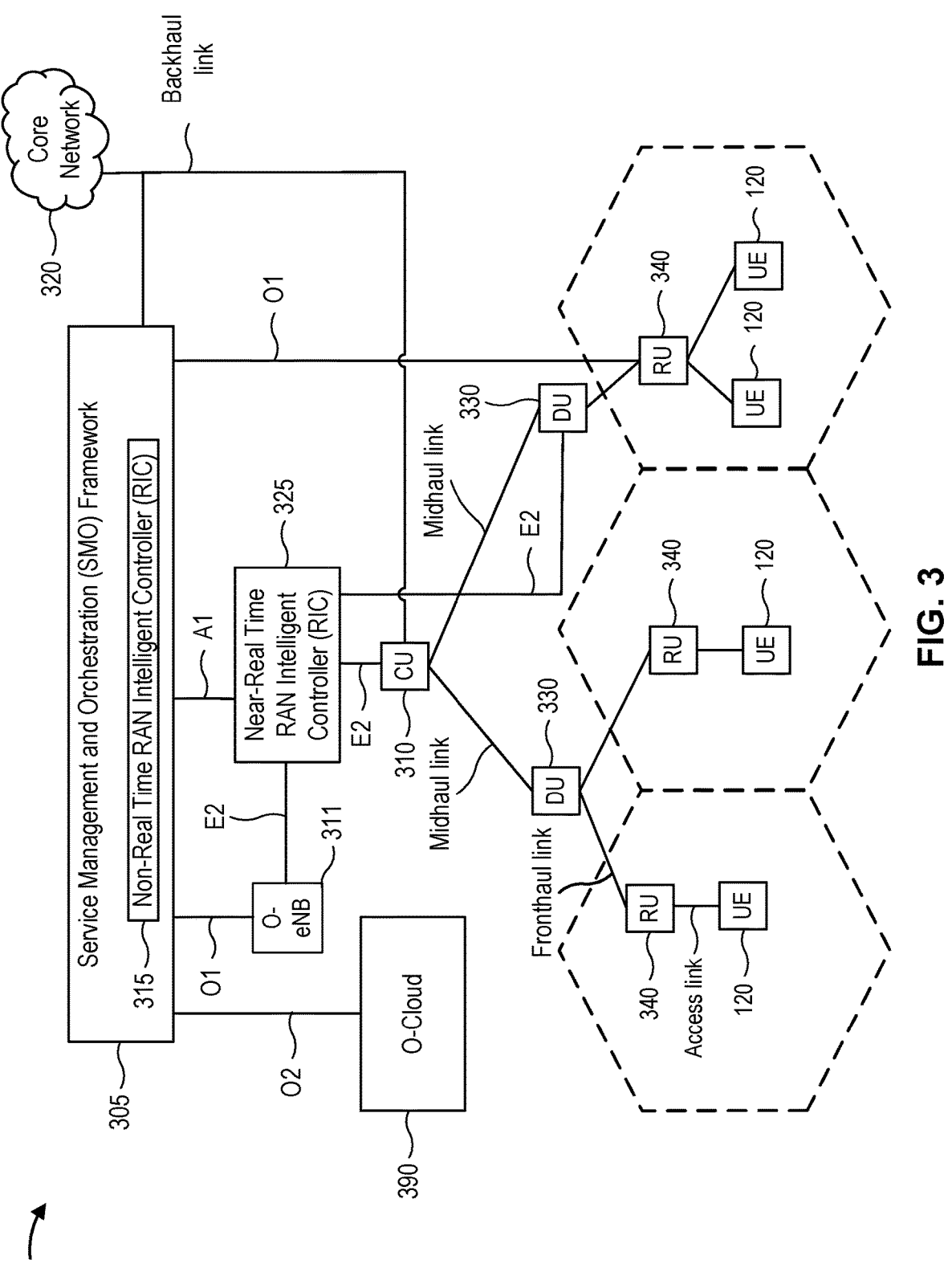
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more Dus, or one or more RUs). In some aspects, a CU may be implemented within a RAN node, and one or more Dus may be co-located with the CU, or alternatively, may be geographically or virtually distributed throughout one or multiple other RAN nodes. The Dus may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more Cus 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more Dus 330 via respective midhaul links, such as an F1 interface. The Dus 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The Dus 330 and the RUs 340 may also be referred to as "O-RAN Dus (O-Dus")" and "O-RAN RUs (O-RUs)", respectively. A network entity may include a CU, a DU, an RU, or any combination of Cus, Dus, and RUs. A network entity may include a disaggregated base station or one or more components of the disaggregated base station, such as a CU, a DU, an RU, or any combination of Cus, Dus, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the Cus 310, the Dus 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration.

The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, Cus 310, Dus 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more Cus 310, one or more Dus 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
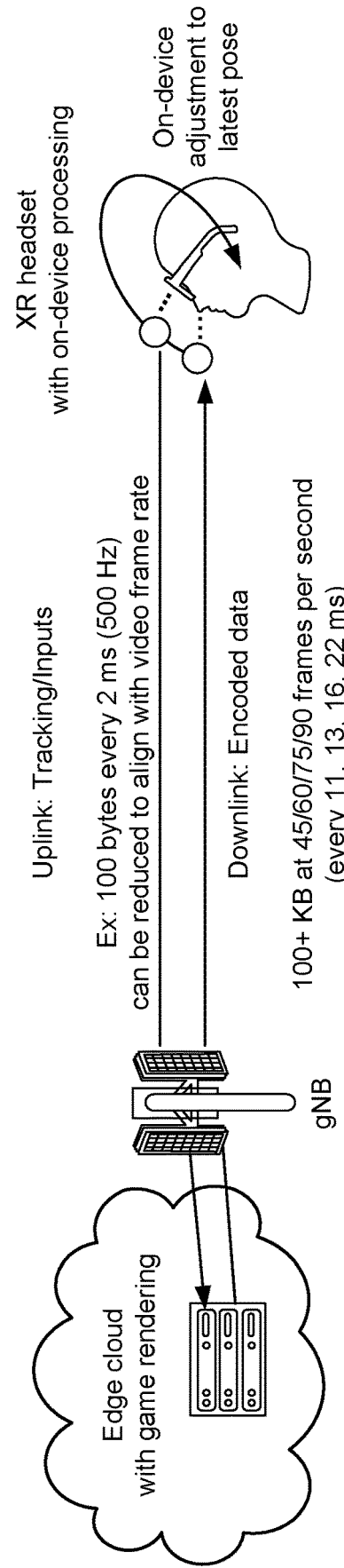
FIG. 4 is a diagram illustrating an example of an extended reality (XR) system, in accordance with the present disclosure.

FIG. 4 is a diagram illustrating an example 400 of an extended reality (XR) system, in accordance with the present disclosure.

Some devices, including devices for XR, may require low-latency traffic to and from an edge server or a cloud environment. Example 400 shows communications between an XR device and the edge server or the cloud environment, via a base station (e.g., gNB). The XR device may be an augmented reality (AR) glass device, a virtual reality (VR) glass device, or other gaming device. XR devices may have limited battery capacity while being expected to have a battery life of a smartphone (e.g., full day of use). Battery power is an issue even when the XR device is tethered to a smartphone and uses the same smartphone battery. XR device power dissipation may be limited and may lead to an uncomfortable user experience and/or a short battery life.

Power dissipation may be reduced by limiting an amount of time that processing resources of the XR device are active for computations and power consumption. Some wireless communication systems may support a UE, such as the XR device, that operates in a DRX mode. A UE in a DRX mode may transition between a sleep state for power conservation and an active state for data transmission and reception. The active state for data transmission and reception may be referred to as a DRX "ON-duration." A UE that uses different DRX cycles may have non-uniform cycle durations within a DRX time period. Such non-uniform cycle durations may provide DRX ON-durations that are aligned with a periodicity of downlink traffic to the UE. In some cases, the DRX time period may correspond to an anchor cycle that spans a set of DRX cycles, and a subset of the set of DRX cycles may have a different cycle duration than other DRX cycles of the set of DRX cycles. In some cases, an ON-duration offset value may be indicated for one or more DRX cycles within the DRX time period (e.g., via downlink control information (DCI) or a MAC CE).

By offloading some computations to an edge server, an XR device may save processing resources. Example 400 shows a scenario where an XR device may split computations for an application with the edge server on the other side of a base station. The edge server may render video frames, such as intra-coded (I) frames and predicted (P) frames, encode the video frames, align the video frames with user pose information, and perform other related computations. However, this means there may be more traffic between the XR device and the edge server, which will cause the XR device to consume more power and signaling resources. XR downlink traffic (e.g., video frames) may have a periodic pattern that corresponds to a frame rate of transmitted video data (e.g., H.264/H.265 encoded video). Such downlink traffic may be quasi-periodic with a data burst every frame at one frame-per-second (one fps), or two possibly staggered "eye-buffers" per frame at ½ fps. For example, XR downlink traffic may include 100+ kilobytes (KB) of data for 45, 60, 75, or 90 frames per second (e.g., every 11 ms, 13 ms, 16 ms, or 22 ms). XR uplink traffic may include controller information for gaming, information for VR split rendering, and/or the user pose information. The XR uplink traffic may include 100 bytes every 2 ms (500 Hz). The XR device may reduce this periodicity to align the XR uplink traffic with the XR downlink traffic.

For low-latency applications, the DRX cycle and a start offset of a DRX cycle are to be time-aligned to downlink traffic arrivals. For example, the XR device may serve the user and enter a brief sleep state in a DRX cycle and between video frames. The XR device and the edge server may attempt to align the uplink and downlink DRX cycles as part of connected DRX (CDRX). However, there are DRX-multimedia timing mismatches that prevent such alignment and that prevent successful use of CDRX. For example, an update rate may be, for example, 120 Hz or 60 Hz, thus resulting in a downlink traffic burst arrival periodicity of 8.333 ms or 16.667 ms, respectively. However, conventional DRX configurations may have one millisecond as the finest granularity for a DRX cycle, and the start of the ON-duration may be aligned to millisecond time boundaries. These partial millisecond differences may compound with each instance of a period to misalign the DRX cycle and the XR traffic periodicity. For example, the XR traffic period may drift to a middle of the DRX cycle. This causes an increase in latency and power consumption.

As indicated above, FIG. 4 is provided as an example. Other examples may differ from what is described with regard to FIG. 4.

Figure 5:
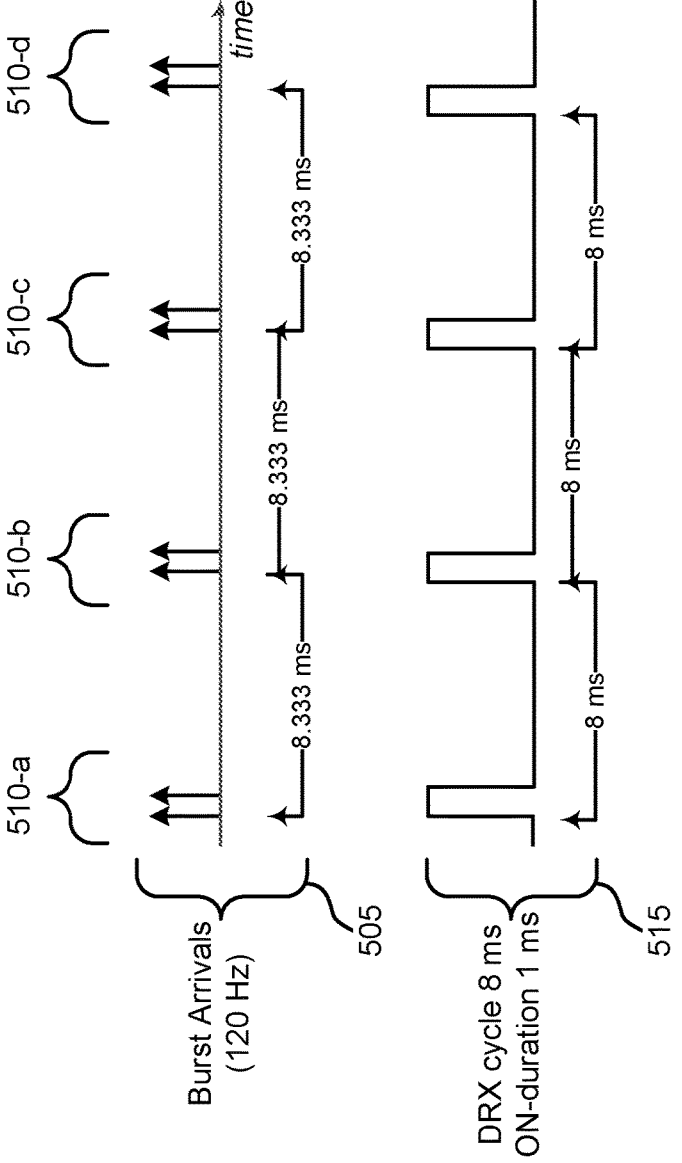
FIG. 5 is a diagram illustrating an example of a discontinuous reception (DRX) cycle, in accordance with the present disclosure.

FIG. 5 is a diagram illustrating an example 500 of a DRX cycle, in accordance with the present disclosure.

Example 500 shows downlink traffic burst arrivals 505 that may include a number of downlink traffic bursts 510 that are transmitted according to a periodic pattern. Example 500 also shows a DRX configuration 515.

The downlink traffic bursts 510 may include, for example, XR downlink traffic with a periodic pattern that corresponds to a frame rate of transmitted data (e.g., H.264/H.265 encoded video). An update rate may be, for example, 120 Hz or 60 Hz, thus resulting in a downlink traffic burst arrival periodicity of 8.333 ms or 16.667 ms, respectively. If the DRX configuration 515 has ON-duration occasions that are aligned with the downlink traffic burst 510-*a*, the second downlink traffic burst 510-*b* and the third downlink traffic burst 510-*a* will each also be within the subsequent two ON-durations.

As indicated above, FIG. 5 is provided as an example. Other examples may differ from what is described with respect to FIG. 5.

Figure 6:
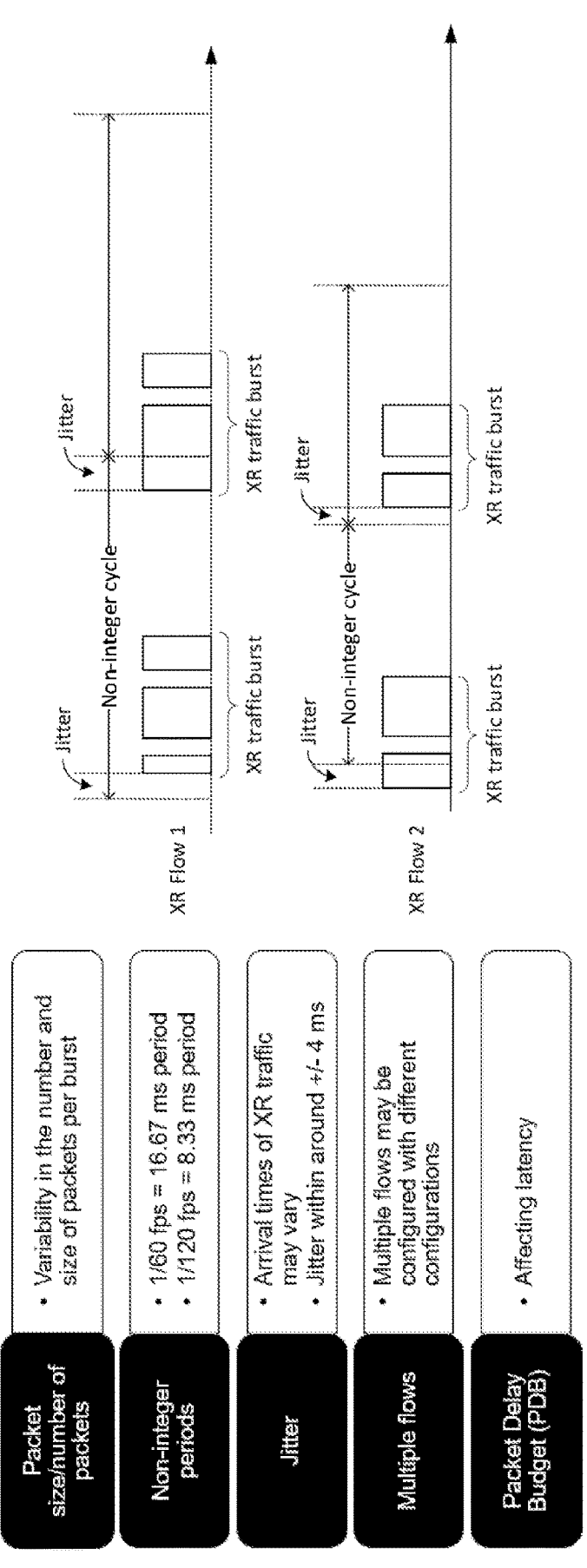
FIG. 6 is a diagram illustrating an example of XR flows, in accordance with the present disclosure.

FIG. 6 is a diagram illustrating an example 600 of XR flows, in accordance with the present disclosure.

Example 600 shows XR Flow 1 and XR Flow 2, which have XR traffic bursts that are periodic with some time jitter in the arrival. The packet sizes and their number of packets for a certain burst may be variable. Multiple traffic flows can be used for downlink with different periodicities. However, configuring multiple CDRXs for the multiple different periodicities flows requires the UE to be sleeping for less time, which consumes power.

As indicated above, FIG. 6 is provided as an example. Other examples may differ from what is described with regard to FIG. 6.

FIG. 7 is a diagram illustrating an example 700 of a timing for multiple DRX cycles, in accordance with the present disclosure.

According to various aspects described herein, a UE may receive an indication of a timing of DRX ON-duration occasions. The timing may be associated with a combination of a first DRX cycle with a first periodicity for a first data flow and a second DRX cycle with a second periodicity for a second data flow. The data flows may be XR data flows with periodic traffic and/or traffic bursts. The UE may monitor for communications of the first data flow and the second data flow at the DRX on-duration occasions. In some aspects, the timing may be associated with a greater of the first DRX cycle and the second DRX cycle.

Each flow may have a configured CDRX cycle with parameters tailored to that traffic. For example, CDRX on-duration occasions may be different locations for different CDRX cycles. The UE is aware of the number of flows that are received on the downlink. If a minimum CDRX cycle is a non-integer, it is expected that the CDRX cycle would be extended to accommodate XR traffic with a typical periodicity like 16.67 milliseconds (ms) or 8.33 ms. Example 700 shows that the CDRX cycle for multiple flows may be a minimum of CDRX_cycle_1 for XR Flow 1 and a CDRX_cycle_2 for XR Flow 2.

In some aspects, a next wake up ON-duration occasion that is not aligned with the multi-flow CDRX cycle may be indicated through a physical downlink control channel (PDCCH)-based notification (e.g., DCI) in the CDRX ON-duration occasion aligned with CDRX cycle. The PDCCH-based notification may also include parameter changes. For example, DCI in a first CDRX cycle ON-duration occasion for XR Flow 1 may indicate a location of an CDRX ON-duration occasion for XR Flow 2. For jitter handling, PDCCH monitoring may start a few slots before or end a few slots after a CDRX ON-duration occasion.

In some aspects, a designated PDCCH monitoring occasion may be in a CDRX ON-duration where "next wake notifications" are sent (e.g., the first PDCCH monitoring occasion). The network entity (e.g., gNB) may or may not align the initial transmissions from the multiple flows.

Example 702 shows that the CDRX cycle for multiple flows may be a maximum CDRX cycle of the CDRXs for the flows. This may impact the latency of the flows with a smaller periodicity, but the packet delay budget (PDB) may be long enough to accommodate this. In some aspects, the multi-flow CDRX cycle may be a function of PDB_1, PDB_2, Periodicity_1, and Periodicity_2. For example, multi-flow CDRX cycle=min(PDB_1×Periodicity_1, PDB_2×Periodicity_2)/PDB_min, where PDB_min is the PDB of the flow min(PDB_1×Periodicity_1, PDB_2×Periodicity_2).

As indicated above, FIG. 7 is provided as an example. Other examples may differ from what is described with regard to FIG. 7.

Figure 8:
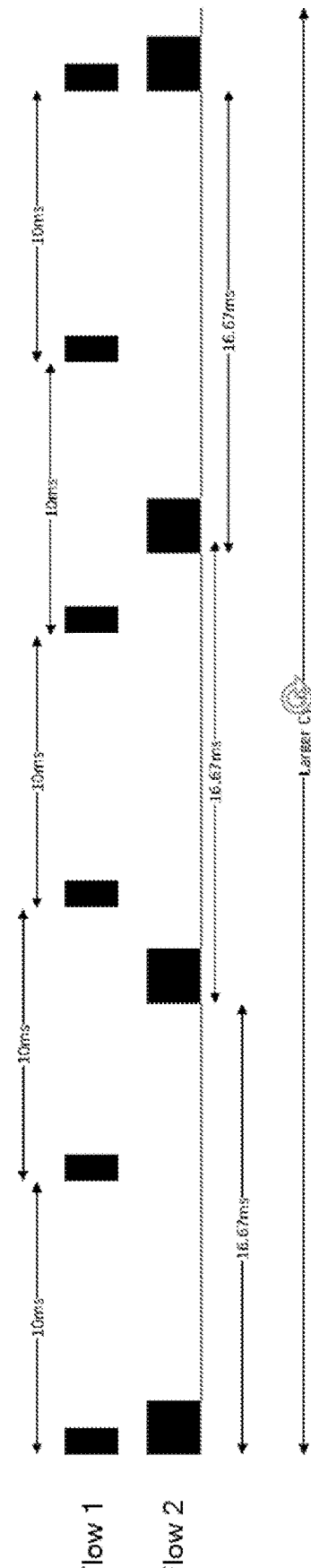
FIG. 8 is a diagram illustrating an example of a non-uniform DRX cycle of multiple data flows, in accordance with the present disclosure.

FIG. 8 is a diagram illustrating an example 800 of a non-uniform DRX cycle of multiple data flows, in accordance with the present disclosure.

Example 800 shows a non-uniform CDRX cycle occurring during a larger cycle. The non-uniform pattern may be fixed during a large cycle and updated for the next large cycle if any parameters need to be changed. The non-uniform CDRX cycle may be a predefined sequence over an epoch, where an epoch includes multiple CDRX cycles. In some aspects, messaging may be sent once per epoch to adapt parameters within that epoch.

As indicated above, FIG. 8 is provided as an example. Other examples may differ from what is described with regard to FIG. 8.

Figure 9:
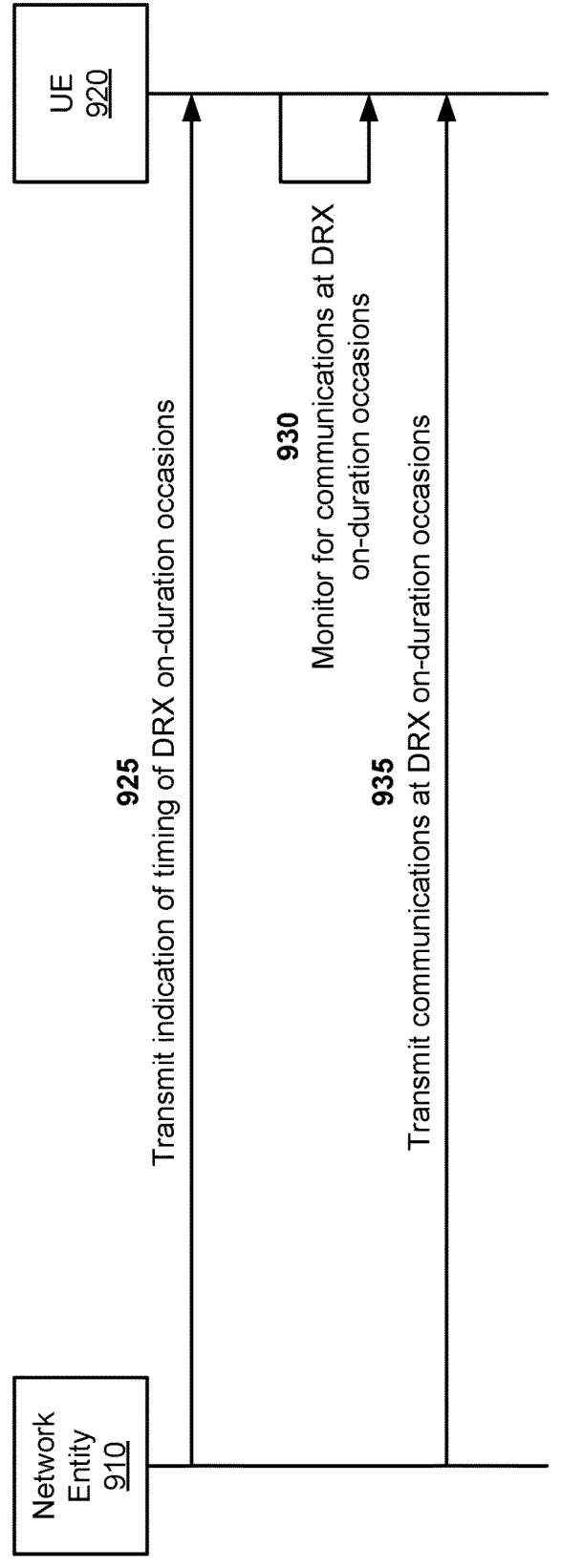
FIG. 9 is a diagram illustrating an example associated with DRX for multiple data flows, in accordance with the present disclosure.

FIG. 9 is a diagram illustrating an example 900 associated with DRX for multiple data flows, in accordance with the present disclosure. As shown in FIG. 9, a network entity 910 (e.g., base station 110) and a UE 920 (e.g., UE 120) may communicate with one another on a wireless network (e.g., wireless network 100).

As shown by reference number 925, the network entity 910 may transmit an indication of a timing of DRX ON-duration occasions that is associated with a combination of (or a greater of) a first DRX cycle with a first periodicity for a first data flow and a second DRX cycle with a second periodicity for a second data flow. The timing may include time locations of DRX ON-duration occasions that account for the multiple DRX cycles of the data flows (e.g., XR flows) for a periodic application (e.g., XR application). This may include DRX ON-duration occasions that overlap or do not overlap. This may include non-uniform occasion locations for one flow between periodic occasion locations for another flow. Some DRX ON-duration occasions for one flow or DRX cycle may include information for locations of DRX ON-duration occasions for the other flow or DRX cycle. One DRX cycle may be an anchor cycle that serves as a time or occasion reference for one or more other DRX cycles. The anchor cycle and DRX ON-duration occasions for multiple DRX cycles may be based at least in part on a periodicity and/or a PDB for each DRX cycle.

As shown by reference number 930, the UE 920 may monitor for communications at the DRX ON-duration occasions according to the timing. In this way, when the network entity 910 transmits the communications at the DRX ON-duration occasions, as shown by reference number 935, the UE 920 may receive the communications while sleeping more and conserving more power.

In some aspects, the network entity 910 may further adjust the timing to help the UE 920 to conserve power. This may include overlapping and/or consolidating DRX ON-duration occasions from among the multiple DRX cycles.

As indicated above, FIG. 9 is provided as an example. Other examples may differ from what is described with respect to FIG. 9.

FIG. 10 is a diagram illustrating an example process 1000 performed, for example, by a UE, in accordance with the present disclosure. Example process 1000 is an example where the UE (e.g., UE 120, UE 920) performs operations associated with DRX for multiple flows.

As shown in FIG. 10, in some aspects, process 1000 may include receiving an indication of a timing of DRX on-duration occasions that is associated with a combination of a first DRX cycle with a first periodicity for a first data flow and a second DRX cycle with a second periodicity for a second data flow (block 1010). For example, the UE (e.g., using communication manager 1408 and/or reception component 1402 depicted in FIG. 14) may receive an indication of a timing of DRX on-duration occasions that is associated with a combination of a first DRX cycle with a first periodicity for a first data flow and a second DRX cycle with a second periodicity for a second data flow, as described above.

As further shown in FIG. 10, in some aspects, process 1000 may include monitoring for communications of the first data flow and the second data flow at the DRX on-duration occasions (block 1020). For example, the UE (e.g., using communication manager 1408 and/or monitoring component 1410 depicted in FIG. 14) may monitor for communications of the first data flow and the second data flow at the DRX on-duration occasions, as described above.

Process 1000 may include additional aspects, such as any single aspect or any combination of aspects described below and/or in connection with one or more other processes described elsewhere herein.

In a first aspect, the indication identifies the first DRX cycle or the second DRX cycle as an anchor cycle, and DRX on-duration occasions of the anchor cycle include information that indicates on-duration occasions of a non-anchor DRX cycle.

In a second aspect, alone or in combination with the first aspect, the anchor cycle has a periodicity that is a minimum of the first periodicity and the second periodicity.

In a third aspect, alone or in combination with one or more of the first and second aspects, the anchor cycle has a periodicity that is a maximum of the first periodicity and the second periodicity.

In a fourth aspect, alone or in combination with one or more of the first through third aspects, DCI in a DRX on-duration occasion of the first DRX cycle indicates a location of a DRX on-duration occasion of the second DRX cycle.

In a fifth aspect, alone or in combination with one or more of the first through fourth aspects, the timing is based at least in part on a first PDB for the first DRX cycle, the first periodicity, a second PDB for the second DRX cycle, and the second periodicity.

In a sixth aspect, alone or in combination with one or more of the first through fifth aspects, the timing is based at least in part on a minimum of the first PDB×the first periodicity and the second PDB×the second periodicity, divided by a minimum PDB that is a PDB of a flow minimum of the first PDB×the first periodicity and the second PDB×the second periodicity.

In a seventh aspect, alone or in combination with one or more of the first through sixth aspects, the timing of the DRX on-duration occasions includes a non-uniform DRX cycle.

In an eighth aspect, alone or in combination with one or more of the first through seventh aspects, the timing is specified for an epoch of multiple connected mode DRX cycles.

In a ninth aspect, alone or in combination with one or more of the first through eighth aspects, one or more of the first DRX cycle or the second DRX cycle correspond to a periodicity of XR traffic.

In a tenth aspect, alone or in combination with one or more of the first through ninth aspects, one or more of the first data flow or the second data flow includes XR traffic.

In an eleventh aspect, alone or in combination with one or more of the first through tenth aspects, process 1000 includes monitoring for communications one or more slots before or after a DRX on-duration occasion.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
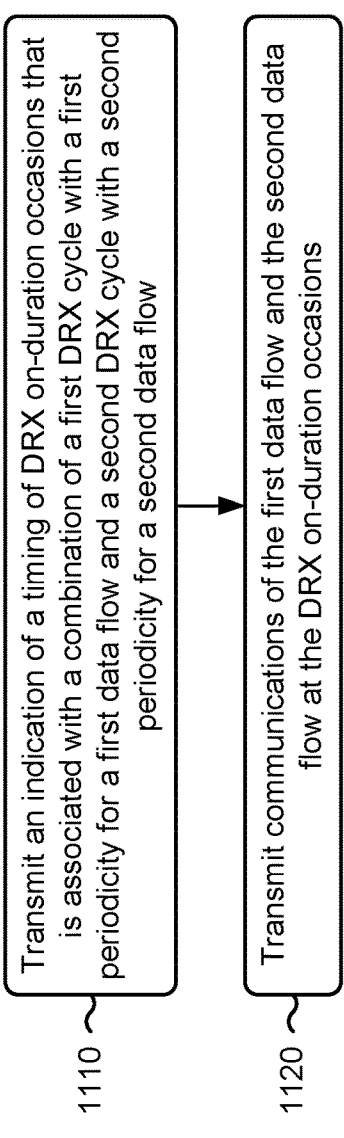
FIG. 11 is a diagram illustrating an example process performed, for example, by a network entity, in accordance with the present disclosure.

FIG. 11 is a diagram illustrating an example process 1100 performed, for example, by a network entity, in accordance with the present disclosure. Example process 1100 is an example where the network entity (e.g., base station 110, network entity 910) performs operations associated with DRX for multiple flows.

As shown in FIG. 11, in some aspects, process 1100 may include transmitting an indication of a timing of DRX on-duration occasions that is associated with a combination of a first DRX cycle with a first periodicity for a first data flow and a second DRX cycle with a second periodicity for a second data flow (block 1110). For example, the network entity (e.g., using communication manager 1508 and/or transmission component 1504 depicted in FIG. 15) may transmit an indication of a timing of DRX on-duration occasions that is associated with a combination of a first DRX cycle with a first periodicity for a first data flow and a second DRX cycle with a second periodicity for a second data flow, as described above.

As further shown in FIG. 11, in some aspects, process 1100 may include transmitting communications of the first data flow and the second data flow at the DRX on-duration occasions (block 1120). For example, the network entity (e.g., using communication manager 1508 and/or transmission component 1504 depicted in FIG. 15) may transmit communications of the first data flow and the second data flow at the DRX on-duration occasions, as described above.

Process 1100 may include additional aspects, such as any single aspect or any combination of aspects described below and/or in connection with one or more other processes described elsewhere herein.

In a first aspect, the indication identifies the first DRX cycle or the second DRX cycle as an anchor cycle, and DRX on-duration occasions of the anchor cycle indicate on-duration occasions of a non-anchor DRX cycle.

In a second aspect, alone or in combination with the first aspect, the anchor cycle has a periodicity that is a minimum of the first periodicity and the second periodicity.

In a third aspect, alone or in combination with one or more of the first and second aspects, DCI in a DRX on-duration occasion of the first DRX cycle indicates a location of a DRX on-duration occasion of the second DRX cycle.

In a fourth aspect, alone or in combination with one or more of the first through third aspects, the timing is based at least in part on a first PDB for the first DRX cycle, the first periodicity, a second PDB for the second DRX cycle, and the second periodicity.

In a fifth aspect, alone or in combination with one or more of the first through fourth aspects, the timing is based at least in part on a minimum of the first PDB×the first periodicity and the second PDB×the second periodicity, divided by a minimum PDB that is a PDB of a flow minimum of the first PDB×the first periodicity and the second PDB×the second periodicity.

In a sixth aspect, alone or in combination with one or more of the first through fifth aspects, the timing of the DRX on-duration occasions includes a non-uniform DRX cycle.

In a seventh aspect, alone or in combination with one or more of the first through sixth aspects, the timing is specified for an epoch of multiple connected mode DRX cycles.

In an eighth aspect, alone or in combination with one or more of the first through seventh aspects, one or more of the first DRX cycle or the second DRX cycle correspond to a periodicity of extended reality traffic.

In a ninth aspect, alone or in combination with one or more of the first through eighth aspects, one or more of the first data flow or the second data flow includes extended reality traffic.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
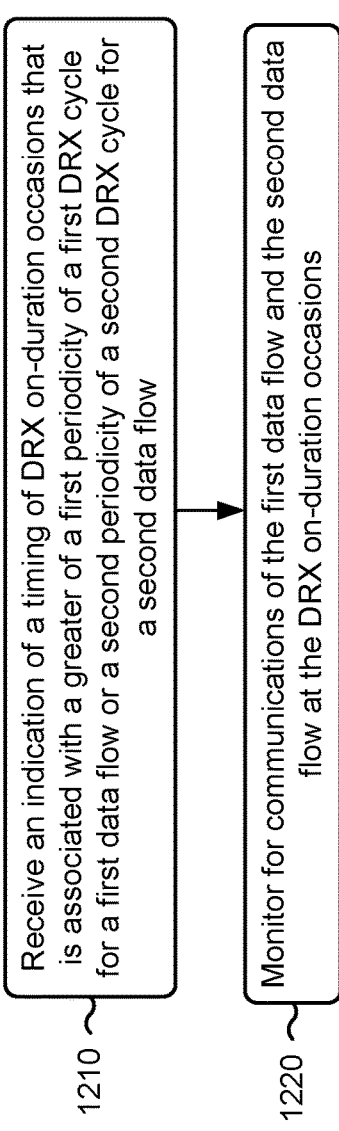
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with DRX for multiple flows.

As shown in FIG. 12, in some aspects, process 1200 may include receiving an indication of a timing of DRX on-duration occasions that is associated with a greater of a first periodicity of a first DRX cycle for a first data flow or a second periodicity of a second DRX cycle for a second data flow (block 1210). For example, the UE (e.g., using communication manager 1408 and/or reception component 1402 depicted in FIG. 14) may receive an indication of a timing of DRX on-duration occasions that is associated with a greater of a first periodicity of a first DRX cycle for a first data flow or a second periodicity of a second DRX cycle for a second data flow, as described above.

As further shown in FIG. 12, in some aspects, process 1200 may include monitoring for communications of the first data flow and the second data flow at the DRX on-duration occasions (block 1220). For example, the UE (e.g., using communication manager 1408 and/or monitoring component 1410 depicted in FIG. 14) may monitor for communications of the first data flow and the second data flow at the DRX on-duration occasions, as described above.

Process 1200 may include additional aspects, such as any single aspect or any combination of aspects described below and/or in connection with one or more other processes described elsewhere herein.

In a first aspect, one or more of the first DRX cycle or the second DRX cycle correspond to a periodicity of XR traffic.

In a second aspect, alone or in combination with the first aspect, one or more of the first data flow or the second data flow includes XR traffic.

In a third aspect, alone or in combination with one or more of the first and second aspects, DCI in a DRX on-duration occasion of the first DRX cycle indicates a location of a DRX on-duration occasion of the second DRX cycle.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
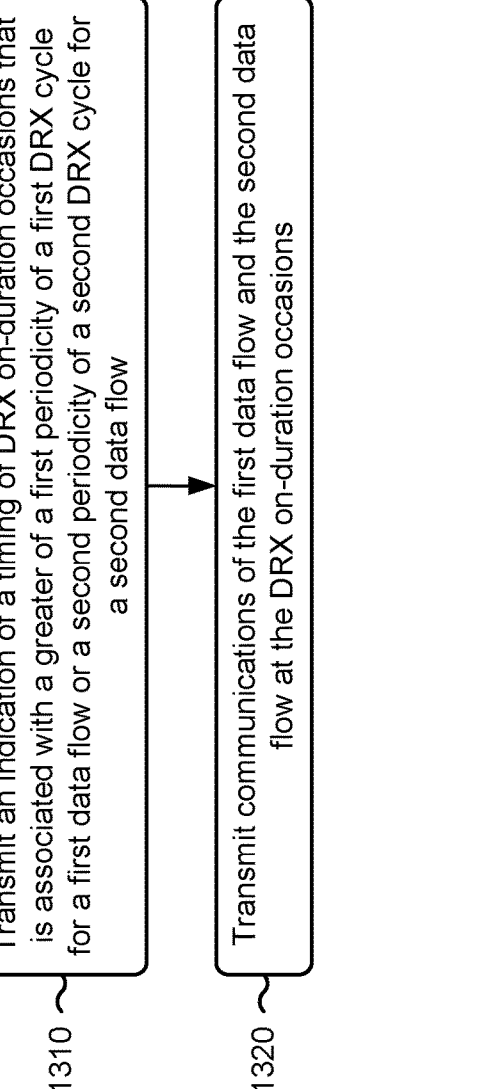
FIG. 13 is a diagram illustrating an example process performed, for example, by a network entity, in accordance with the present disclosure.

FIG. 13 is a diagram illustrating an example process 1300 performed, for example, by a network entity, in accordance with the present disclosure. Example process 1300 is an example where the network entity (e.g., base station 110, a network entity 910) performs operations associated with DRX for multiple flows.

As shown in FIG. 13, in some aspects, process 1300 may include transmitting an indication of a timing of DRX on-duration occasions that is associated with a greater of a first periodicity of a first DRX cycle for a first data flow or a second periodicity of a second DRX cycle for a second data flow (block 1310). For example, the network entity (e.g., using communication manager 1508 and/or transmission component 1504 depicted in FIG. 15) may transmit an indication of a timing of DRX on-duration occasions that is associated with a greater of a first periodicity of a first DRX cycle for a first data flow or a second periodicity of a second DRX cycle for a second data flow, as described above.

As further shown in FIG. 13, in some aspects, process 1300 may include transmitting communications of the first data flow and the second data flow at the DRX on-duration occasions (block 1320). For example, the network entity (e.g., using communication manager 1508 and/or transmission component 1504 depicted in FIG. 15) may transmit communications of the first data flow and the second data flow at the DRX on-duration occasions, as described above.

Process 1300 may include additional aspects, such as any single aspect or any combination of aspects described below and/or in connection with one or more other processes described elsewhere herein.

In a first aspect, one or more of the first DRX cycle or the second DRX cycle correspond to a periodicity of XR traffic.

In a second aspect, alone or in combination with the first aspect, one or more of the first data flow or the second data flow includes XR traffic.

In a third aspect, alone or in combination with one or more of the first and second aspects, DCI in a DRX on-duration occasion of the first DRX cycle indicates a location of a DRX on-duration occasion of the second DRX cycle.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
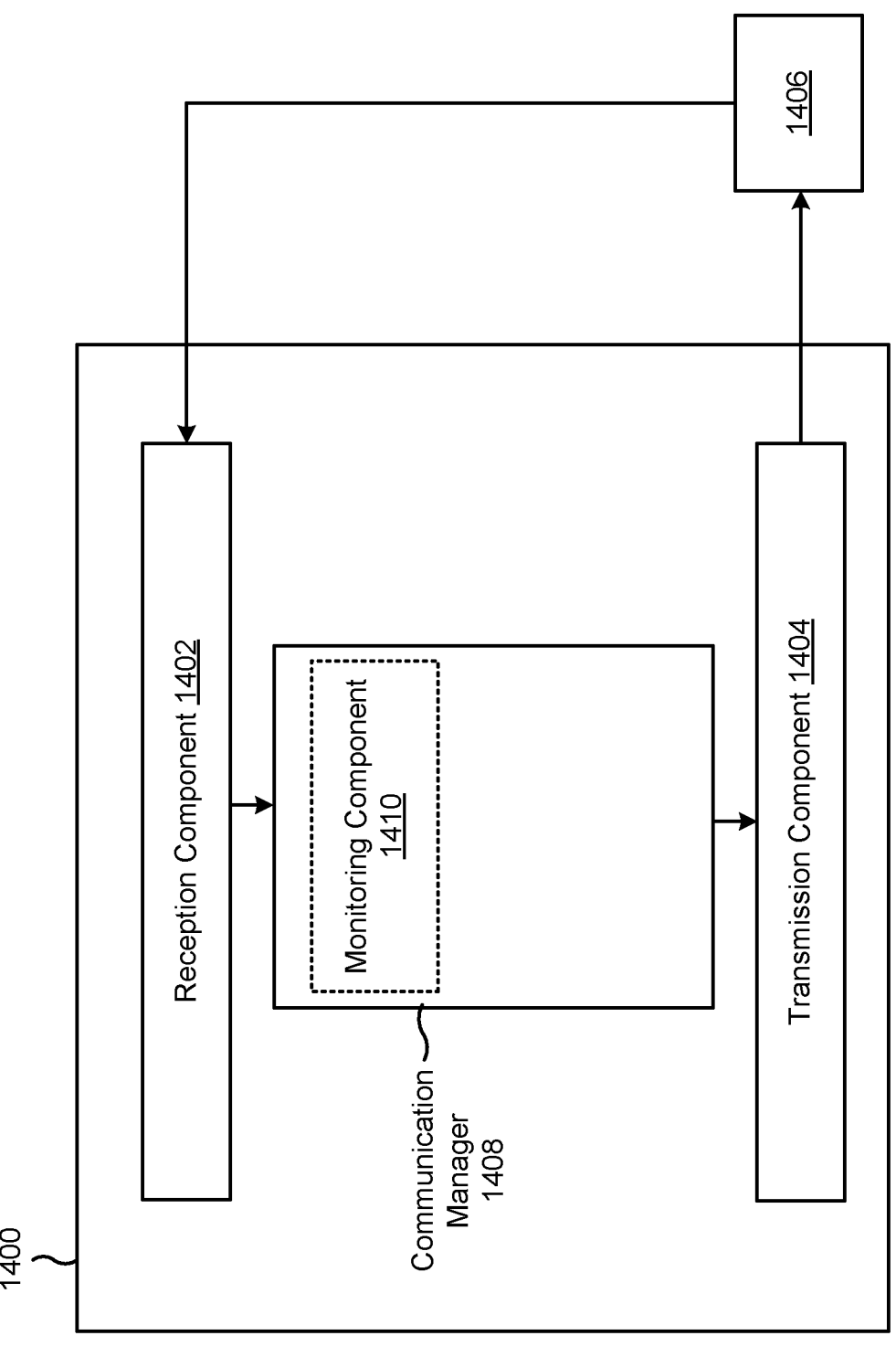
FIGS. 14 and 15 are diagrams of example apparatuses for wireless communication, in accordance with the present disclosure.

FIG. 14 is a diagram of an example apparatus 1400 for wireless communication. The apparatus 1400 may be a UE (e.g., a UE 120, UE 920), or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 1408. The communication manager 1408 may control and/or otherwise manage one or more operations of the reception component 1402 and/or the transmission component 1404. In some aspects, the communication manager 1408 may include one or more antennas, a modem, a controller/processor, a memory, or a combination thereof, of the UE described in connection with FIG. 2. The communication manager 1408 may be, or be similar to, the communication manager 140 depicted in FIGS. 1 and 2. For example, in some aspects, the communication manager 1408 may be configured to perform one or more of the functions described as being performed by the communication manager 140. In some aspects, the communication manager 1408 may include the reception component 1402 and/or the transmission component 1404. The communication manager 1408 may include a monitoring component 1410, among other examples.

In some aspects, the apparatus 1400 may be configured to perform one or more operations described herein in connection with FIGS. 1-9. Additionally, or alternatively, the apparatus 1400 may be configured to perform one or more processes described herein, such as process 1000 of FIG. 11, process 1200 of FIG. 12, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

In some aspects, the reception component 1402 may receive an indication of a timing of DRX on-duration occasions that is associated with a combination of a first DRX cycle with a first periodicity for a first data flow and a second DRX cycle with a second periodicity for a second data flow. The monitoring component 1410 may monitor for communications of the first data flow and the second data flow at the DRX on-duration occasions. The monitoring component 1410 may monitor for communications one or more slots before or after a DRX on-duration occasion.

In some aspects, the reception component 1402 may receive an indication of a timing of DRX on-duration occasions that is associated with a greater of a first periodicity of a first DRX cycle for a first data flow or a second periodicity of a second DRX cycle for a second data flow. The monitoring component 1410 may monitor for communications of the first data flow and the second data flow at the DRX on-duration occasions.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
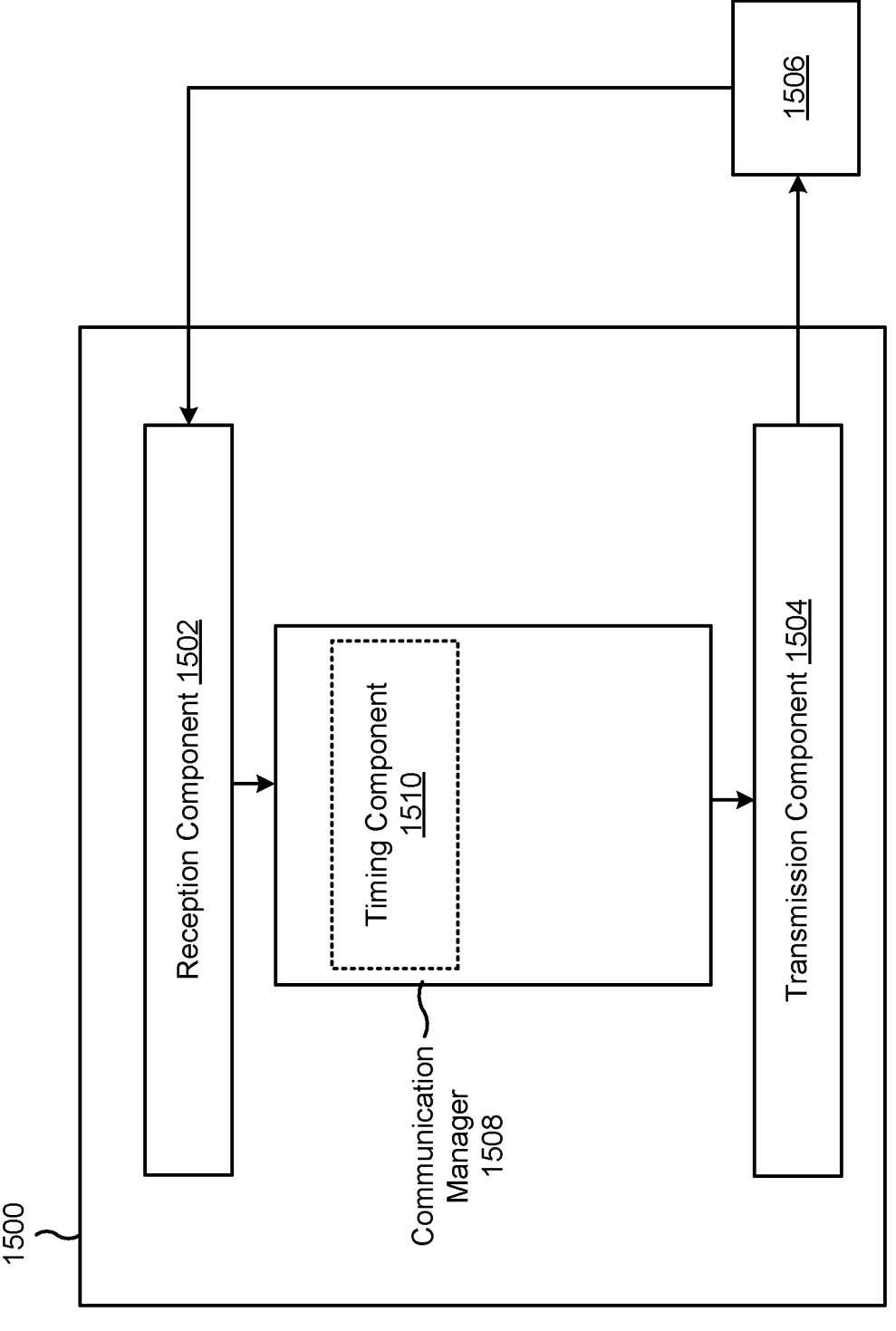

FIG. 15 is a diagram of an example apparatus 1500 for wireless communication. The apparatus 1500 may be a network entity (e.g., a base station 110, network entity 910), or a network entity may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 1508. The communication manager 1508 may control and/or otherwise manage one or more operations of the reception component 1502 and/or the transmission component 1504. In some aspects, the communication manager 1508 may include one or more antennas, a modem, a controller/processor, a memory, or a combination thereof, of the network entity described in connection with FIG. 2. The communication manager 1508 may be, or be similar to, the communication manager 150 depicted in FIGS. 1 and 2. For example, in some aspects, the communication manager 1508 may be configured to perform one or more of the functions described as being performed by the communication manager 1508. In some aspects, the communication manager 1508 may include the reception component 1502 and/or the transmission component 1504. The communication manager 1508 may include a timing component 1510, among other examples.

In some aspects, the apparatus 1500 may be configured to perform one or more operations described herein in connection with FIGS. 1-9. Additionally, or alternatively, the apparatus 1500 may be configured to perform one or more processes described herein, such as process 1100 of FIG. 11, process 1300 of FIG. 13, or a combination thereof. In some aspects, the apparatus 1500 and/or one or more components shown in FIG. 15 may include one or more components of the network entity described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network entity described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network entity described in connection with FIG. 2. In some aspects, the transmission component 1504 may be co-located with the reception component 1502 in a transceiver.

In some aspects, the transmission component 1504 may transmit an indication of a timing of DRX on-duration occasions that is associated with a combination of a first DRX cycle with a first periodicity for a first data flow and a second DRX cycle with a second periodicity for a second data flow. The timing component 1510 may generate the timing based on a UE capability, channel conditions, or traffic conditions (e.g., number of XR flows, amount of data in each XR flow, periodicity of XR flows). The transmission component 1504 may transmit communications of the first data flow and the second data flow at the DRX on-duration occasions.

In some aspects, the transmission component 1504 may transmit an indication of a timing of DRX on-duration occasions that is associated with a greater of a first periodicity of a first DRX cycle for a first data flow or a second periodicity of a second DRX cycle for a second data flow. The timing component 1510 may generate the timing based on a UE capability, channel conditions, or traffic conditions (e.g., number of XR flows, amount of data in each XR flow, periodicity of XR flows). The transmission component 1504 may transmit communications of the first data flow and the second data flow at the DRX on-duration occasions.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Bursty traffic, such as XR traffic, VR traffic, and other similar types of traffic, is particularly sensitive to latency. Configuring transmission and reception of bursty traffic using dynamic grants (DGs) consumes significant amounts of power, processing resources, and network overhead. Configuring transmission and reception of bursty traffic using SPS (for downlink) and CG (for uplink) conserves power, processing resources, and network overhead as compared with DGs. However, SPS occasions and CG occasions that are too long result in wasted power and processing resources at whichever device is receiving while SPS occasions and CG occasions that are too short increase latency.

Some techniques and apparatuses described herein enable a network entity (e.g., network entity 1601, base station 110, CU 310, DU 330, RU 340, and/or apparatus 2500 of FIG. 25) to configure an SPS occasion with a plurality of PDSCHs and a CG occasion with a plurality of PUSCHs. As a result, the network entity can configure longer SPS occasions and CG occasions to reduce latency for bursty traffic transmitted during the SPS occasions and CG occasions.

Additionally, in some aspects, a UE (e.g., UE 120 and/or apparatus 2400 of FIG. 24) conserves power and processing resources when the network entity 1601 indicates that some PDSCHs in an SPS occasion can be skipped. Similarly, the network entity 1601 conserves processing resources and network overhead when the UE 120 indicates that some PUSCHs in a CG occasion can be skipped. Additionally, or alternatively, the network entity 1601 may configure properties (e.g., MCSs) of each PDSCH and each PUSCH individually. As a result, the network entity 1601 may increase reliability and/or quality of traffic transmitted during the SPS occasions and CG occasions.

Figure 16:
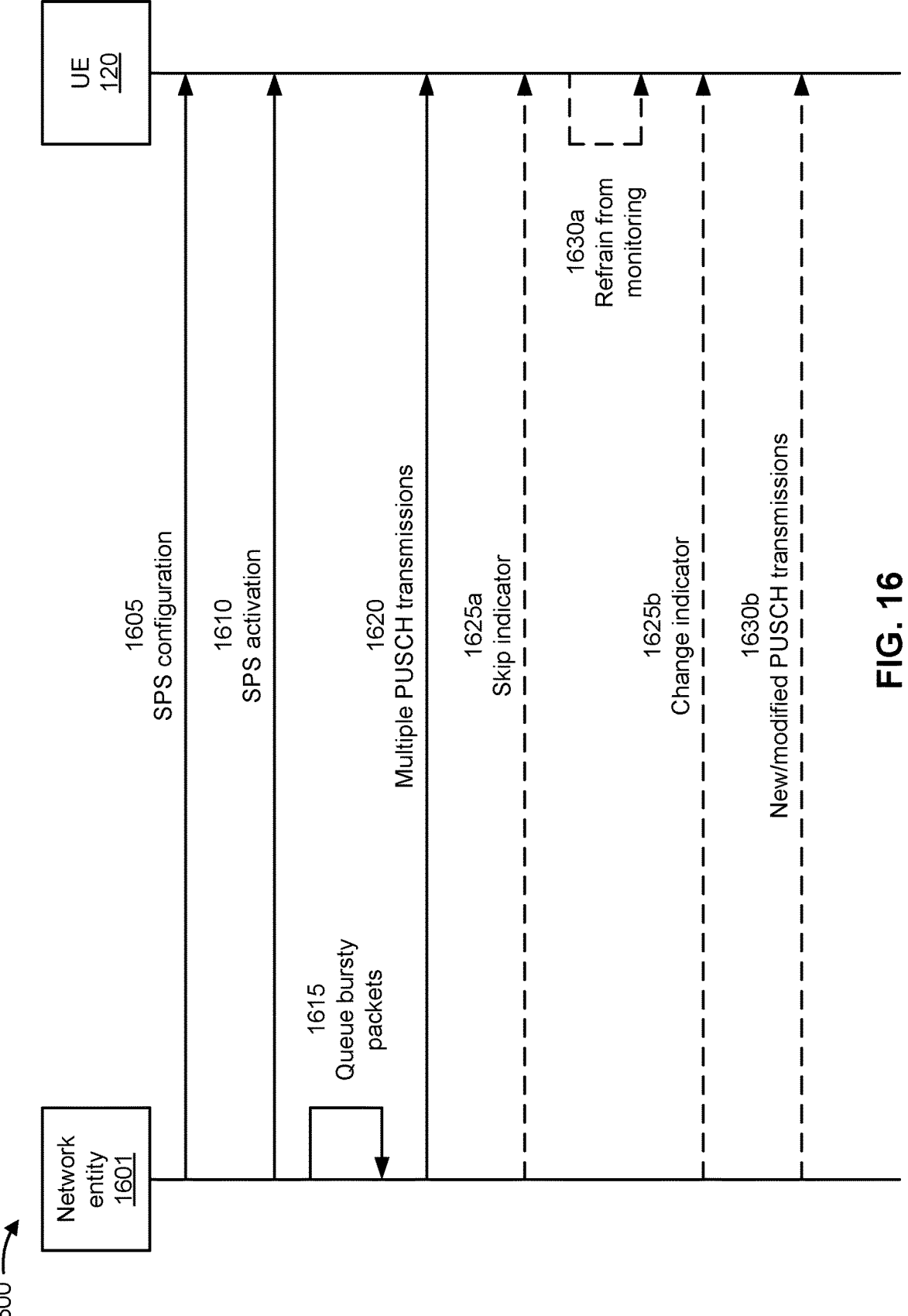
FIGS. 16 and 17 are diagrams illustrating examples associated with using multiple channels for semi-persistent scheduling (SPS) occasions, in accordance with the present disclosure.

FIG. 16 is a diagram illustrating an example 1600 associated with using multiple channels for SPS occasions, in accordance with the present disclosure. As shown in FIG. 16, a network entity 1601 (e.g., an RU 340 and/or a device controlling the RU 340, such as a CU 310 and/or DU 330) and a UE 120 may communicate with one another (e.g., on a wireless network, such as wireless network 100 of FIG. 1).

As shown by reference number 1605, the network entity 1601 may transmit (e.g., directly or via an RU 340 controlled by the network entity 1601), and the UE 120 may receive, a configuration associated with SPS that indicates a plurality of PDSCHs within each SPS occasion for the UE 120. For example, as described in connection with FIG. 5, each SPS occasion may include a plurality of PDSCHs to allow the network entity 1601 to transmit bursty traffic to the UE 120 (e.g., XR packets, VR packets, and/or other types of packets).

In some aspects, the configuration may be included in an RRC message. For example, the network entity 1601 may encode the configuration in an SPS-Config data structure, as defined in 3GPP specifications and/or another standard. In some aspects, the configuration may indicate a periodicity (e.g., in a periodicity data structure, as defined in 3GPP specifications and/or another standard) based on frames per second (fps). For example, the configuration may indicate a periodicity of 16.67 milliseconds (ms) when associated with traffic characterized by 60 fps. Similarly, the configuration may indicate a periodicity of 8.33 ms when associated with traffic characterized by 120 fps.

Accordingly, the network entity 1601 may determine the configuration based, at least in part, on one or more traffic statistics associated with a plurality of packets to be transmitted using the plurality of PDSCHs. For example, the network entity 1601 may determine the periodicity based on a periodicity associated with the plurality of packets (e.g., an fps associated with the plurality of packets). Additionally, or alternatively, the network entity 1601 may determine a size (e.g., a quantity of symbols in time and/or a quantity of resource blocks (RBs) in frequency) for each PDSCH based on an average size or a median size of packets within the plurality of packets. Additionally, or alternatively, the network entity 1601 may determine a length (e.g., a quantity of symbols in time) for each SPS occasion based on an average quantity of packets in, and/or an average total size of, each burst associated with the plurality of packets.

Each PDSCH may be associated with a single transport block (TB). As used herein, a "transport block" refers to a data payload passed from a higher layer (e.g., a MAC layer of the UE 120) to a lower layer (e.g., a PHY layer of the UE 120). A TB may include a portion of a packet, a single packet, or multiple packets, from the plurality of packets to be transmitted.

Additionally, each PDSCH of the plurality of PDSCHs is associated with a corresponding MCS, a corresponding redundancy version (RV), and a corresponding start and length indicator value (SLIV). Accordingly, the network entity 1601 may assign different MCSs (e.g., using different mcs-Table data structures, as defined in 3GPP specifications and/or another standard) to different PDSCHs in the same SPS occasion. Similarly, the network entity 1601 may assign different RVs to different PDSCHs in the same SPS occasion. Accordingly, some PDSCHs may be associated with greater reliability while other PDSCHs are associated with greater throughput, depending on the associated MCSs. Similarly, the network entity 1601 may assign different SLIVs to different PDSCHs in the same SPS occasion. Accordingly, some PDSCHs may be capable of carrying larger payloads than other PDSCHs.

Moreover, each SPS occasion is associated with a maximum quantity of PDSCHs. For example, the network entity 1601 may indicate the maximum quantity of PDSCHs for the UE 120 to monitor during each SPS occasion. The network entity 1601 may use fewer than the maximum quantity of PDSCHs, as described below.

Accordingly, as shown by reference number 1610, the network entity 1601 may transmit (e.g., directly or via an RU 340 controlled by the network entity 1601), and the UE 120 may receive, an activation of the SPS configuration. For example, the network entity 1601 may use downlink control information (DCI) and/or a MAC control element (MAC CE) to activate SPS occasions associated with the configuration.

For example, as shown by reference number 1615, the network entity 1601 may activate the SPS configuration in order to queue traffic (e.g., bursty traffic, such as XR packets, VR packets, and/or similar packets) for the plurality of PDSCHs in each SPS occasion. Accordingly, the network entity 1601 may encode the plurality of packets across TBs for transmission on the PDSCHs. As shown by reference number 1620, the network entity 1601 may transmit (e.g., directly or via an RU 340 controlled by the network entity 1601), and the UE 120 may receive, the plurality of packets over the plurality of PDSCHs in at least one SPS occasion associated with the SPS configuration.

Additionally, the UE 120 may transmit, and the network entity 1601 may receive (e.g., directly or via an RU 340 controlled by the network entity 1601), a plurality of acknowledgement signals (e.g., acknowledgement (ACK) signals and/or negative-acknowledgement (NACK) signals) associated with the plurality of packets. In some aspects, the UE 120 may multiplex the acknowledgement signals into a single physical uplink control channel (PUCCH). For example, the PUCCH may be indicated in the SPS configuration (e.g., as described in connection with reference number 1605) or in the SPS activation (e.g., as described in connection with reference number 1610).

Based on receiving one or more NACK signals, the network entity 1601 may transmit (e.g., directly or via an RU 340 controlled by the network entity 1601), and the UE 120 may receive, a dynamic grant (DG) for receiving one or more packets of the plurality of packets. Accordingly, the network entity 1601 may retransmit (e.g., directly or via an RU 340 controlled by the network entity 1601), and the UE 120 may receive, the one or more packets according to the DG. Therefore, retransmissions to the UE 120 may be performed outside the SPS occasions.

In some aspects, as shown by reference number 1625a, the network entity 1601 may transmit (e.g., directly or via an RU 340 controlled by the network entity 1601), and the UE 120 may receive, an indication associated with skipping one or more PDSCHs of the plurality of PDSCHs within the at least one SPS occasion. For example, the queue associated with the one or more PDSCHs may be empty. In some aspects, the indication may be transmitted via DMRS, PDCCH, and/or PDSCH, as described in connection with FIG. 5. Accordingly, as by reference number 1630a, the UE 120 may refrain from monitoring, and the network entity 1601 may refrain from transmitting, during the one or more PDSCHs, which conserves power and processing resources.

Additionally, or alternatively, as shown by reference number 1625b, the network entity 1601 may transmit (e.g., directly or via an RU 340 controlled by the network entity 1601), and the UE 120 may receive, an indication associated with adding one or more additional PDSCHs within the at least one SPS occasion. For example, the queue associated with the SPS occasions may include data. In some aspects, the indication may be transmitted via DMRS, PDCCH, and/or PDSCH, as described in connection with FIG. 5. Accordingly, as shown by reference number 1630b, the UE 120 may monitor, and the network entity 1601 may transmit, during the one or more additional PDSCHs, which reduces latency associated with the data still in the queue.

Additionally, or alternatively, as further shown by reference number 1625b, the network entity 1601 may transmit (e.g., directly or via an RU 340 controlled by the network entity 1601), and the UE 120 may receive, an indication associated with modifying a property of one or more PDSCHs of the plurality of PDSCHs within the at least one SPS occasion. For example, the network entity 1601 may try to increase reliability, quality, and/or throughput associated with the one or more PDSCHs. In some aspects, the indication may be transmitted via DMRS, PDCCH, and/or PDSCH, as described in connection with FIG. 5. Accordingly, as shown by reference number 1630b, the UE 120 may monitor, and the network entity 1601 may transmit, during the one or more PDSCHs based on the modified property.

By using techniques as described in connection with FIG. 16, the network entity 1601 may configure an SPS occasion with a plurality of PDSCHs. As a result, the network entity 1601 can configure longer SPS occasions to reduce latency for bursty traffic transmitted during the SPS occasions. Additionally, in some aspects, the UE 120 conserves power and processing resources when the network entity 1601 indicates that some PDSCHs in an SPS occasion can be skipped. Additionally, or alternatively, the network entity 1601 may configure properties (e.g., MCSs) of each PDSCH individually. As a result, the network entity 1601 may increase reliability and/or quality of traffic transmitted during the SPS occasions.

As indicated above, FIG. 16 is provided as an example. Other examples may differ from what is described with respect to FIG. 16.

Figure 17:
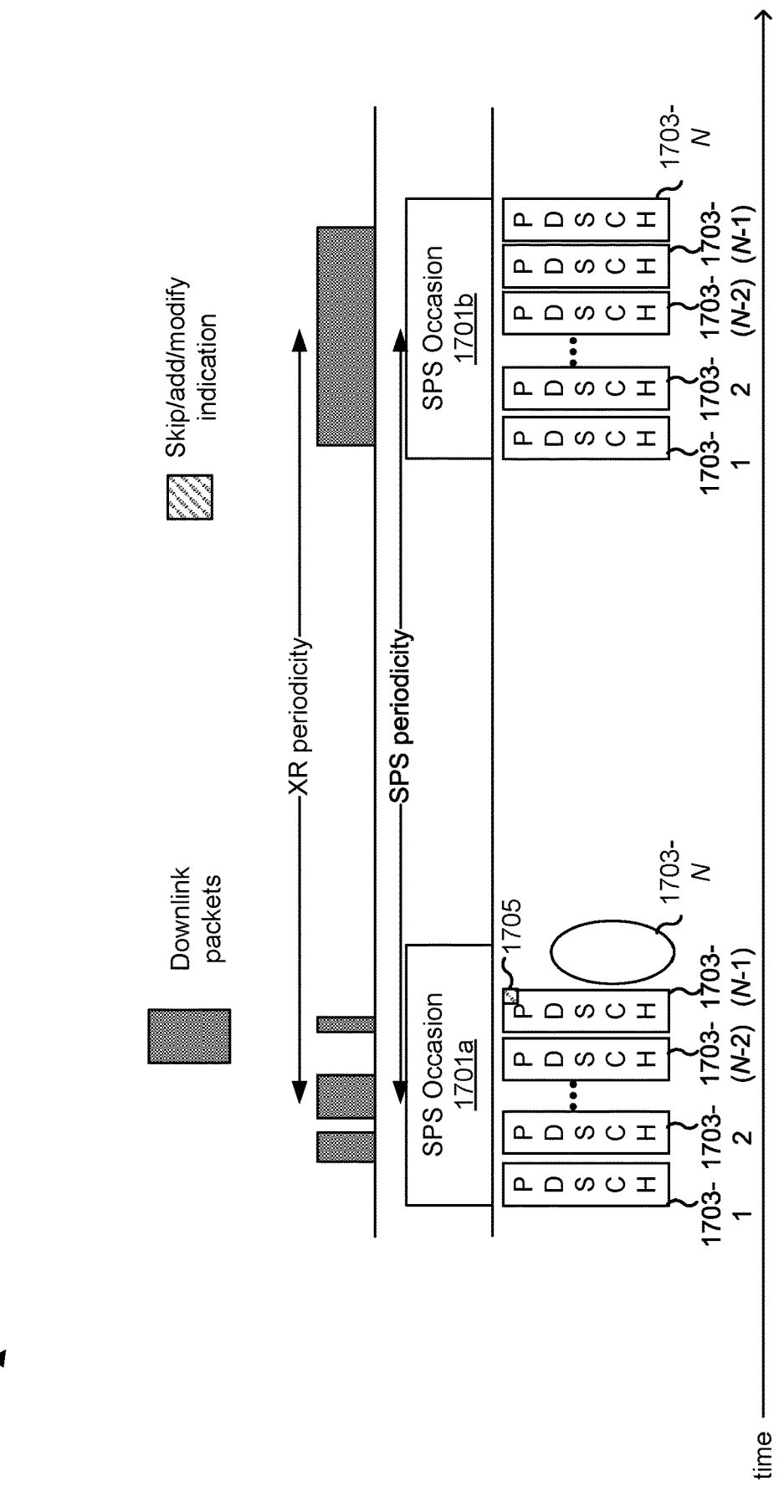

FIG. 17 is a diagram illustrating an example 1700 associated with using multiple channels for SPS occasions, in accordance with the present disclosure. As shown in FIG. 17, example 1700 includes a plurality of downlink packets (e.g., for transmission from a network entity 1601 to a UE 120) encoding XR traffic (or another type of bursty traffic). The network entity 1601 may queue the downlink packets for transmission in TBs associated with SPS occasions (e.g., SPS occasion 1701a, SPS occasion 1701b, and so on in example 1700). In some aspects, the XR traffic may be associated with a periodicity such that the network entity 1601 selects a corresponding periodicity (e.g., a closest periodicity from a plurality possible periodicities) for the SPS occasions.

As further shown in FIG. 17, each SPS occasion 1701 includes a plurality of PDSCHs. In example 1700, each SPS occasion 1701 includes PDSCH 1703-1, PDSCH 1703-2, . . . , PDSCH 1703-(N−2), PDSCH 1703-(N−1), and PDSCH 1703-N, where Nis a positive integer representing the quantity of PDSCHs per SPS occasion.

In some aspects, the network entity 1601 may transmit an indication 1705 to skip one or more PDSCHs. In example 1700, PDSCH 1703-N is skipped based on the indication 1705 transmitted on the PDSCH 1703-(N−1). The indication 1705 may identify specific PDSCHs to skip, instruct the UE 120 to skip a subsequent quantity of PDSCHs after the indication 1705, instruct the UE 120 to skip a pattern of PDSCHs after the indication 1705 (e.g., all PDSCHs associated with an even symbol and/or slot index or all PDSCHs associated with an odd symbol and/or slot index, among other examples). The PDSCHs to skip may be in a same SPS occasion or a different SPS occasion than the SPS occasion in which the indication 1705 is transmitted. The indication 1705 may be included in a DMRS (e.g., by selecting a particular sequence for encoding the DMRS) of a PDSCH (e.g., the PDSCH 1703-(N−1) in example 1700). Additionally, or alternatively, the indication 1705 may be transmitted as a MAC CE on a PDSCH (e.g., the PDSCH 1703-(N−1) in example 1700) or as DCI piggy-backed on a PDSCH (e.g., the PDSCH 1703-(N−1) in example 1700). Additionally, or alternatively, the indication 1705 may be transmitted as DCI on a PDCCH (e.g., a PDCCH during SPS occasion 1701a in example 1700).

Alternatively, the indication 1705 may add one or more PDSCHs. The indication 1705 may identify specific PDSCHs to add, instruct the UE 120 to monitor a particular quantity of PDSCHs after the indication 1705, instruct the UE 120 to monitor a pattern of PDSCHs after the indication 1705. The PDSCHs to add may be in a same SPS occasion or a different SPS occasion than the SPS occasion in which the indication 1705 is transmitted. The indication 1705 may be included in a DMRS (e.g., by selecting a particular sequence for encoding the DMRS) of a PDSCH. Additionally, or alternatively, the indication 1705 may be transmitted as a MAC CE on a PDSCH (e.g., the PDSCH 1703-(N−1) in example 1700) or as DCI piggy-backed on a PDSCH (e.g., the PDSCH 1703-(N−1) in example 1700). Additionally, or alternatively, the indication 1705 may be transmitted as DCI on a PDCCH (e.g., a PDCCH during SPS occasion 1701a in example 1700).

Additionally, or alternatively, the indication 1705 may modify one or more of the PDSCHs. For example, the indication 1705 may modify an MCS, an RV, a SLIV, and/or another similar property of the PDSCHs. The PDSCHs to modify may be in a same SPS occasion or a different SPS occasion than the SPS occasion in which the indication 1705 is transmitted. The indication 1705 may be included in a DMRS (e.g., by selecting a particular sequence for encoding the DMRS) of a PDSCH. Additionally, or alternatively, the indication 1705 may be transmitted as a MAC CE on a PDSCH (e.g., the PDSCH 1703-(N−1) in example 1700) or as DCI piggy-backed on a PDSCH (e.g., the PDSCH 1703-(N−1) in example 1700). Additionally, or alternatively, the indication 1705 may be transmitted as DCI on a PDCCH (e.g., a PDCCH during SPS occasion 1701a in example 1700).

As indicated above, FIG. 17 is provided as an example. Other examples may differ from what is described with respect to FIG. 17.

Figure 18:
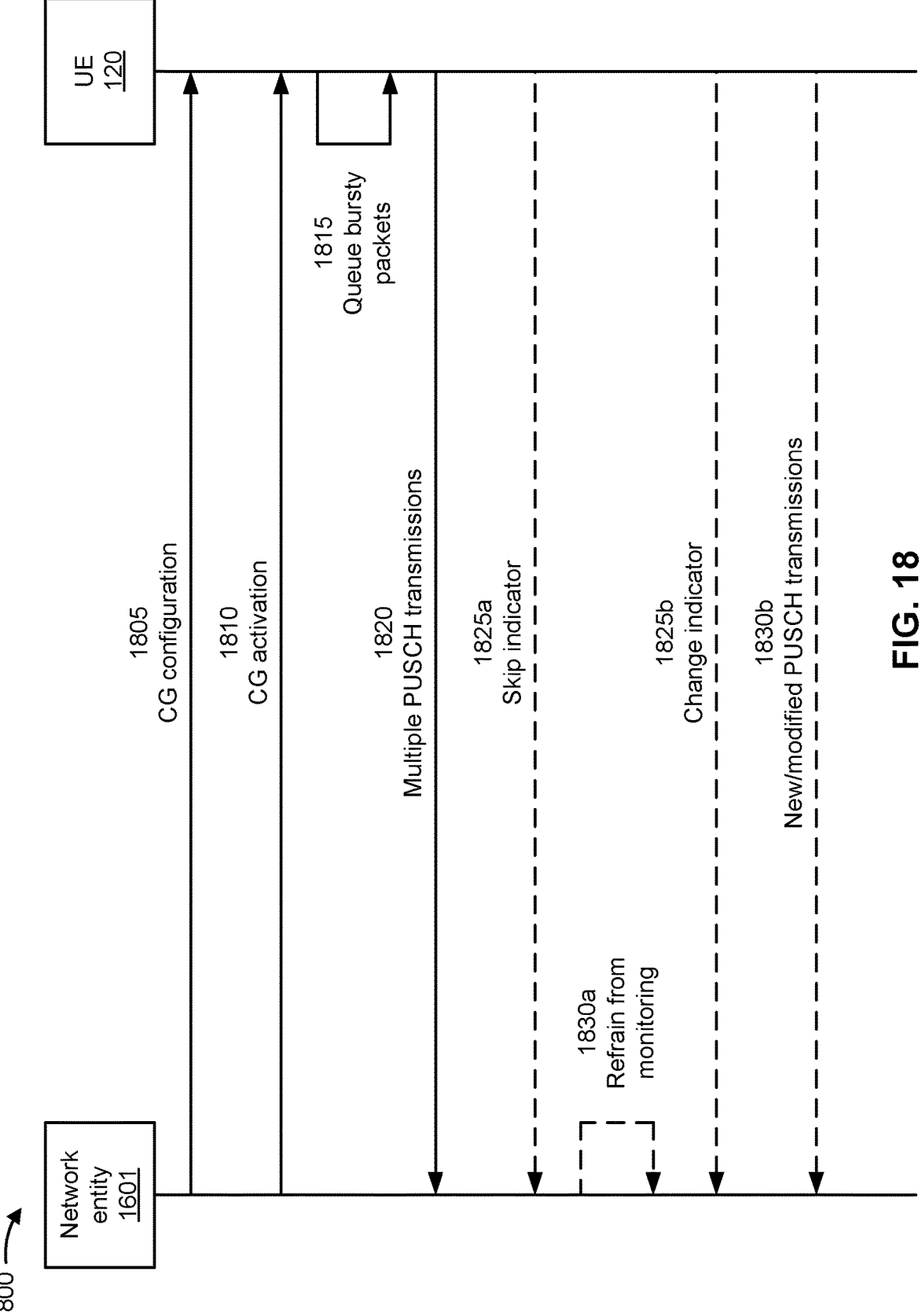
FIGS. 18 and 19 are diagrams illustrating examples associated with using multiple channels for configured grant (CG) occasions, in accordance with the present disclosure.

FIG. 18 is a diagram illustrating an example 1800 associated with using multiple channels for CG occasions, in accordance with the present disclosure. As shown in FIG. 18, a network entity 1601 (e.g., an RU 340 and/or a device controlling the RU 340, such as a CU 310 and/or DU 330) and a UE 120 may communicate with one another (e.g., on a wireless network, such as wireless network 100 of FIG. 1).

As shown by reference number 1805, the network entity 1601 may transmit (e.g., directly or via an RU 340 controlled by the network entity 1601), and the UE 120 may receive, a configuration associated with associated with CG that indicates a plurality of PUSCHs within each CG occasion for the UE 120. For example, as described in connection with FIG. 19, each CG occasion may include a plurality of PUSCHs to allow the UE 120 to transmit bursty traffic to the network entity 1601 (e.g., XR packets, VR packets, and/or other types of packets).

In some aspects, the configuration may be included in an RRC message. For example, the network entity 1601 may encode the configuration in a ConfiguredGrantConfig data structure, as defined in 3GPP specifications and/or another standard. In some aspects, the configuration may indicate a periodicity (e.g., in a periodicity data structure, as defined in 3GPP specifications and/or another standard) based on fps. For example, the configuration may indicate a periodicity of 16.67 ms when associated with traffic characterized by 60 fps. Similarly, the configuration may indicate a periodicity of 8.33 ms when associated with traffic characterized by 120 fps.

Accordingly, the UE 120 may request the configuration based, at least in part, on one or more traffic statistics associated with a plurality of packets to be transmitted using the plurality of PUSCHs. For example, the UE 120 may request the periodicity based on a periodicity associated with the plurality of packets (e.g., an fps associated with the plurality of packets). Additionally, or alternatively, the UE 120 may request a size (e.g., a quantity of symbols in time and/or a quantity of RBs in frequency) for each PUSCH based on an average size or a median size of packets within the plurality of packets. Additionally, or alternatively, UE 120 may request a length (e.g., a quantity of symbols in time) for each CG occasion based on an average quantity of packets in, and/or an average total size of, each burst associated with the plurality of packets.

Each PUSCH may be associated with a single TB. Additionally, each PUSCH of the plurality of PUSCHs is associated with a corresponding MCS and a corresponding quantity of RBs. As used herein, "resource block" or "RB" may refer to one or more subcarriers (e.g., each subcarrier may include one or more frequencies), which may be consecutive in a frequency domain. Accordingly, an RB may include a plurality of resource elements (REs), where each RE corresponds to a single subcarrier. Additionally, each RE may correspond to a single symbol in a time domain (e.g., an OFDM symbol and/or another symbol according to a multiplexing scheme used by the network entity 1601 and/or an RU 340 controlled by the network entity 1601).

Accordingly, the network entity 1601 may assign different MCSs (e.g., using different mcs-Table data structures, as defined in 3GPP specifications and/or another standard) to different PUSCHs in the same CG occasion. Accordingly, some PUSCHs may be associated with greater reliability while other PUSCHs are associated with greater throughput, depending on the associated MCSs. Similarly, the network entity 1601 may assign different quantities of RBs (e.g., using different rbg-Size data structures, as defined in 3GPP specifications and/or another standard) to different PUSCHs in the same CG occasion. Accordingly, some PUSCHs may be capable of carrying larger payloads than other PUSCHs.

Moreover, each CG occasion is associated with a maximum quantity of PUSCHs. For example, the network entity 1601 may indicate the maximum quantity of PUSCHs for the UE 120 to use during each SPS occasion. The UE 120 may use fewer than the maximum quantity of PUSCHs, as described below.

Accordingly, as shown by reference number 1810, the network entity 1601 may transmit (e.g., directly or via an RU 340 controlled by the network entity 1601), and the UE 120 may receive, an activation of the CG configuration. For example, the network entity 1601 may use DCI and/or a MAC CE to activate CG occasions associated with the configuration.

For example, as shown by reference number 1815, the network entity 1601 may activate the CG configuration such that the UE 120 may queue traffic (e.g., bursty traffic, such as XR packets, VR packets, and/or similar packets) for the plurality of PUSCHs in each CG occasion. Accordingly, the UE 120 may encode the plurality of packets across TBs for transmission on the PUSCHs. As shown by reference number 1820, the UE 120 may transmit, and the network entity 1601 may receive (e.g., directly or via an RU 340 controlled by the network entity 1601), the plurality of packets over the plurality of PUSCHs in at least one CG occasion associated with the CG configuration.

When one or more packets are not received by the network entity 1601, the network entity 1601 may transmit (e.g., directly or via an RU 340 controlled by the network entity 1601), and the UE 120 may receive, a DG for retransmitting one or more packets of the plurality of packets. Accordingly, the UE 120 may retransmit, and the network entity 1601 may receive (e.g., directly or via an RU 340 controlled by the network entity 1601), the one or more packets according to the DG. Therefore, retransmissions to the network entity 1601 may be performed outside the CG occasions.

In some aspects, as shown by reference number 1825a, the UE 120 may transmit, and the network entity 1601 may receive (e.g., directly or via an RU 340 controlled by the network entity 1601), an indication associated with skipping one or more PUSCHs of the plurality of PUSCHs within the at least one CG occasion. For example, the queue associated with the one or more PUSCHs may be empty. In some aspects, the indication may be transmitted via DMRS, PUCCH, and/or PUSCH, as described in connection with FIG. 19. Accordingly, as by reference number 1830a, the network entity 1601 may refrain from monitoring (or instruct an RU 340 to refrain from monitoring), and the UE 120 may refrain from transmitting, during the one or more PUSCHs, which conserves power and processing resources.

Additionally, or alternatively, as shown by reference number 1825b, the UE 120 may transmit, and the network entity 1601 may receive (e.g., directly or via an RU 340 controlled by the network entity 1601), a request associated with adding one or more additional PUSCHs within the at least one CG occasion. For example, the queue associated with the CG occasions may include data. In some aspects, the request may be transmitted via DMRS, PUCCH, and/or PUSCH, as described in connection with FIG. 19. Accordingly, the network entity 1601 may transmit (e.g., directly or via an RU 340 controlled by the network entity 1601), and the UE 120 may receive, an approval of the request such that, as shown by reference number 1830*b*, the UE 120 may transmit, and the network entity 1601 may monitor, during the one or more additional PUSCHs, which reduces latency associated with the data still in the queue.

Additionally, or alternatively, as further shown by reference number 1825*b*, the UE 120 may transmit, and the network entity 1601 may receive (e.g., directly or via an RU 340 controlled by the network entity 1601), a request associated with modifying a property of one or more PUSCHs of the plurality of PUSCHs within the at least one CG occasion. For example, the UE 120 may try to increase reliability, quality, and/or throughput associated with the one or more PUSCHs. In some aspects, the indication may be transmitted via DMRS, PUCCH, and/or PUSCH, as described in connection with FIG. 19. Accordingly, the network entity 1601 may transmit (e.g., directly or via an RU 340 controlled by the network entity 1601), and the UE 120 may receive, an approval of the request such that, as shown by reference number 1830*b*, the UE 120 may transmit, and the network entity 1601 may monitor, during the one or more PUSCHs based on the modified property.

By using techniques as described in connection with FIG. 18, the network entity 1601 may configure a CG occasion with a plurality of PUSCHs. As a result, the network entity 1601 can configure longer CG occasions to reduce latency for bursty traffic transmitted during the CG occasions. Additionally, in some aspects, the network entity 1601 conserves network overhead and processing resources when the UE 120 indicates that some PUSCHs in a CG occasion can be skipped. Additionally, or alternatively, the network entity 1601 may configure properties (e.g., MCSs) of each PUSCH individually. As a result, the network entity 1601 may increase reliability and/or quality of traffic transmitted during the CG occasions.

As indicated above, FIG. 18 is provided as an example. Other examples may differ from what is described with respect to FIG. 18.

Figure 19:
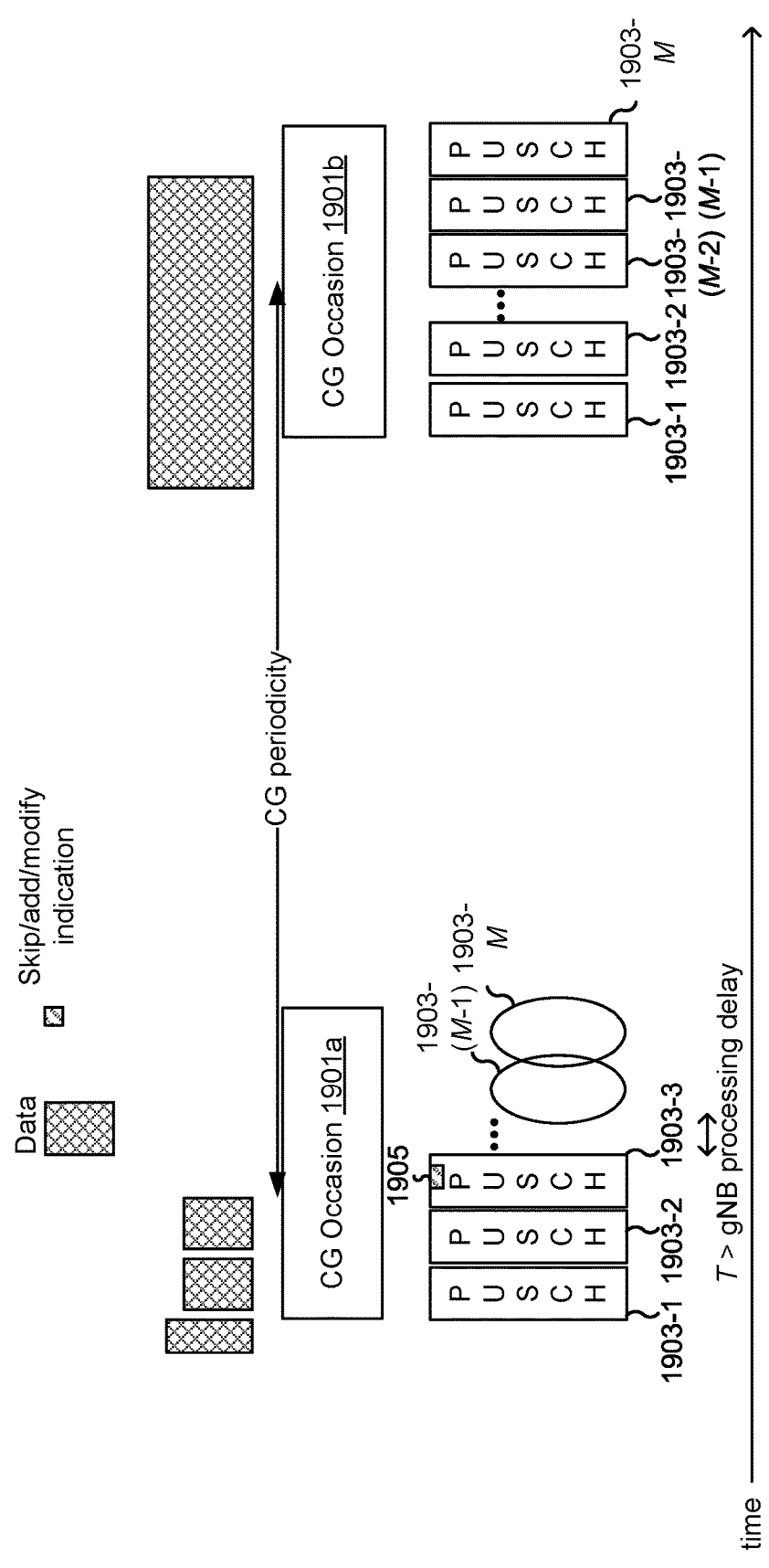

FIG. 19 is a diagram illustrating an example 1900 associated with using multiple channels for CG occasions, in accordance with the present disclosure. As shown in FIG. 19, example 1900 includes a plurality of uplink packets (e.g., for transmission from a UE 120 to a network entity 1601) encoding XR traffic (or another type of bursty traffic). The UE 120 may queue the uplink packets for transmission in TBs associated with CG occasions (e.g., CG occasion 1901*a*, CG occasion 1901*b*, and so on in example 1900). In some aspects, the XR traffic may be associated with a periodicity such that the UE 120 requests a corresponding periodicity (e.g., a closest periodicity from a plurality possible periodicities) for the CG occasions.

As further shown in FIG. 19, each CG occasion 1901 includes a plurality of PUSCHs. In example 1900, each CG occasion 1901 includes PUSCH 1903-1, PUSCH 1903-2, PUSCH 1903-3, . . . , PUSCH 1903-(M−2), PUSCH 1903-(M−1), and PUSCH 1903-N, where M is a positive integer representing the quantity of PUSCHs per CG occasion.

In some aspects, the UE 120 may transmit an indication 1905 to skip one or more PUSCHs. In example 1900, PUSCH 1903-(M−1) and PUSCH 1903-M are skipped based on the indication 1905 transmitted on the PUSCH 1903-3. As further shown in FIG. 19, the UE 120 may transmit the indication 1905 earlier in time by an amount of time T that satisfies a threshold based on how long the network entity 1601 needs to process the indication 1905 (e.g., the threshold may be indicated by the network entity 1601 and/or configured based on a standard, such as 3GPP specification). The indication 1905 may identify specific PUSCHs to skip, instruct the network entity 1601 to skip a subsequent quantity of PUSCHs after the indication 1905, instruct the network entity 1601 to skip a pattern of PUSCHs after the indication 1905 (e.g., all PUSCHs associated with an even symbol and/or slot index or all PUSCHs associated with an odd symbol and/or slot index, among other examples). The PUSCHs to skip may be in a same CG occasion or a different CG occasion than the CG occasion in which the indication 1905 is transmitted. The indication 1905 may be included in a DMRS (e.g., by selecting a particular sequence for encoding the DMRS) of a PUSCH (e.g., the PUSCH 1903-3 in example 1900). Additionally, or alternatively, the indication 1905 may be transmitted as a MAC CE on a PUSCH (e.g., the PUSCH 1903-3 in example 1900) or as uplink control information (UCI) piggy-backed on a PUSCH (e.g., the PUSCH 1903-3 in example 1900). Additionally, or alternatively, the indication 1905 may be transmitted as UCI on a PUCCH (e.g., a PUCCH during CG occasion 1901*a* in example 1900).

Alternatively, the indication 1905 may request to add one or more PUSCHs. The indication 1905 may identify specific PUSCHs to add, request the network entity 1601 to approve a particular quantity of PUSCHs after the indication 1905, request the network entity 1601 to approve a pattern of PUSCHs after the indication 1905. The PUSCHs to add may be in a same CG occasion or a different CG occasion than the CG occasion in which the indication 1905 is transmitted. The indication 1905 may be included in a DMRS (e.g., by selecting a particular sequence for encoding the DMRS) of a PUSCH. Additionally, or alternatively, the indication 1905 may be transmitted as a MAC CE on a PUSCH (e.g., the PUSCH 1903-3 in example 1900) or as UCI piggy-backed on a PUSCH (e.g., the PUSCH 1903-3 in example 1900). Additionally, or alternatively, the indication 1905 may be transmitted as UCI on a PUCCH (e.g., a PUCCH during CG occasion 1901*a* in example 1900).

Additionally, or alternatively, the indication 1905 may request to modify one or more of the PUSCHs. For example, the indication 1905 may request to modify an MCS, an RV, a SLIV, and/or another similar property of the PUSCHs. The PUSCHs to modify may be in a same CG occasion or a different CG occasion than the CG occasion in which the indication 1905 is transmitted. The indication 1905 may be included in a DMRS (e.g., by selecting a particular sequence for encoding the DMRS) of a PUSCH. Additionally, or alternatively, the indication 1905 may be transmitted as a MAC CE on a PUSCH (e.g., the PUSCH 1903-3 in example 1900) or as UCI piggy-backed on a PUSCH (e.g., the PUSCH 1903-3 in example 1900). Additionally, or alternatively, the indication 1905 may be transmitted as UCI on a PUCCH (e.g., a PUCCH during CG occasion 1901*a* in example 1900).

As indicated above, FIG. 19 is provided as an example. Other examples may differ from what is described with respect to FIG. 19.

Figure 20:
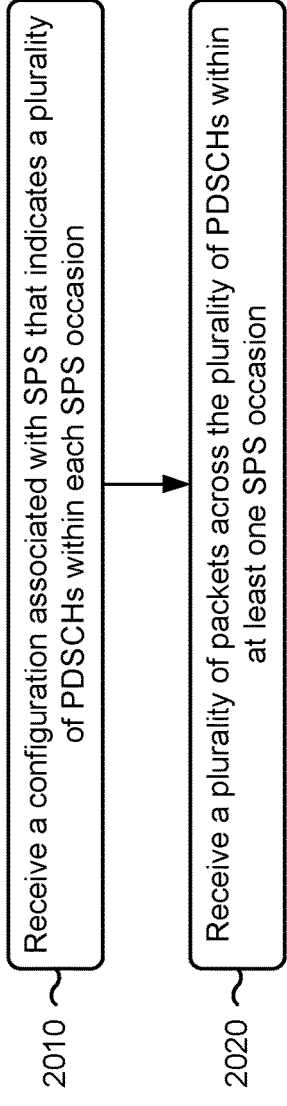

FIG. 20 is a diagram illustrating an example process 2000 performed, for example, by a UE, in accordance with the present disclosure. Example process 2000 is an example where the UE (e.g., UE 120 and/or apparatus 2400 of FIG. 24) performs operations associated with using multiple channels within SPS occasions.

As shown in FIG. 20, in some aspects, process 2000 may include receiving a configuration associated with SPS that indicates a plurality of PDSCHs within each SPS occasion for the UE (block 2010). For example, the UE (e.g., using communication manager 140 and/or reception component 2402, depicted in FIG. 24) may receive a configuration associated with SPS that indicates a plurality of PDSCHs within each SPS occasion for the UE, as described herein.

As further shown in FIG. 20, in some aspects, process 2000 may include receiving a plurality of packets across the plurality of PDSCHs within at least one SPS occasion for the UE (block 2020). For example, the UE (e.g., using communication manager 140 and/or reception component 2402) may receive a plurality of packets across the plurality of PDSCHs within at least one SPS occasion for the UE, as described above.

Process 2000 may include additional aspects, such as any single aspect or any combination of aspects described below and/or in connection with one or more other processes described elsewhere herein.

In a first aspect, the plurality of packets comprises one or more XR packets, one or more VR packets, or a combination thereof.

In a second aspect, alone or in combination with the first aspect, process 2000 further includes receiving (e.g., using communication manager 140 and/or reception component 2402) a configuration associated with a DG for retransmitting one or more packets of the plurality of packets, and receiving (e.g., using communication manager 140 and/or reception component 2402) one or more retransmissions of the one or more packets according to the DG.

In a third aspect, alone or in combination with one or more of the first and second aspects, each PDSCH of the plurality of PDSCHs is associated with a single TB.

In a fourth aspect, alone or in combination with one or more of the first through third aspects, each PDSCH of the plurality of PDSCHs is associated with a corresponding MCS, a corresponding RV, and a corresponding SLIV.

In a fifth aspect, alone or in combination with one or more of the first through fourth aspects, each SPS occasion is associated with a maximum quantity of PDSCHs.

In a sixth aspect, alone or in combination with one or more of the first through fifth aspects, process 2000 further includes receiving (e.g., using communication manager 140 and/or reception component 2402) an indication associated with skipping one or more PDSCHs of the plurality of PDSCHs within the at least one SPS occasion, and refraining from monitoring (e.g., using communication manager 140 and/or monitoring component 2408, depicted in FIG. 24) during the one or more PDSCHs.

In a seventh aspect, alone or in combination with one or more of the first through sixth aspects, process 2000 further includes receiving (e.g., using communication manager 140 and/or reception component 2402) an indication associated with adding one or more additional PDSCHs within the at least one SPS occasion, and monitoring (e.g., using communication manager 140 and/or monitoring component 2408) during the one or more additional PDSCHs.

In an eighth aspect, alone or in combination with one or more of the first through seventh aspects, process 2000 further includes receiving (e.g., using communication manager 140 and/or reception component 2402) an indication associated with modifying a property of one or more PDSCHs of the plurality of PDSCHs within the at least one SPS occasion, and monitoring (e.g., using communication manager 140 and/or monitoring component 2408) during the one or more PDSCHs based on the modified property.

In a ninth aspect, alone or in combination with one or more of the first through eighth aspects, process 2000 further includes transmitting (e.g., using communication manager 140 and/or transmission component 2404, depicted in FIG. 24) a plurality of acknowledgement signals, associated with the plurality of packets, multiplexed into a single PUCCH.

In a tenth aspect, alone or in combination with one or more of the first through ninth aspects, the configuration indicates a periodicity of 16.67 ms or 8.33 ms.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

FIG. 21 is a diagram illustrating an example process 2100 performed, for example, by a network entity, in accordance with the present disclosure. Example process 2100 is an example where the network entity (e.g., network entity 1601 and/or apparatus 2500 of FIG. 25) performs operations associated with using multiple channels within SPS occasions.

As shown in FIG. 21, in some aspects, process 2100 may include transmitting a configuration associated with SPS that indicates a plurality of PDSCHs within each SPS occasion for a UE (e.g., UE 120 and/or apparatus 2400 of FIG. 24) (block 2110). For example, the network entity (e.g., using communication manager 150 and/or transmission component 2504, depicted in FIG. 25) may transmit a configuration associated with SPS that indicates a plurality of PDSCHs within each SPS occasion for a UE, as described herein.

As further shown in FIG. 21, in some aspects, process 2100 may include transmitting a plurality of packets across the plurality of PDSCHs within at least one SPS occasion for the UE (block 2120). For example, the network entity (e.g., using communication manager 150 and/or transmission component 2504, depicted in FIG. 25) may transmit a plurality of packets across the plurality of PDSCHs within at least one SPS occasion for the UE, as described herein.

Process 2100 may include additional aspects, such as any single aspect or any combination of aspects described below and/or in connection with one or more other processes described elsewhere herein.

In a first aspect, the plurality of packets comprises one or more XR packets, one or more VR packets, or a combination thereof.

In a second aspect, alone or in combination with the first aspect, process 2100 further includes transmitting (e.g., using communication manager 150 and/or transmission component 2504) a configuration associated with a DG for retransmitting one or more packets of the plurality of packets, and retransmitting (e.g., using communication manager 150 and/or transmission component 2504) the one or more packets according to the DG.

In a third aspect, alone or in combination with one or more of the first and second aspects, each PDSCH of the plurality of PDSCHs is associated with a single TB.

In a fourth aspect, alone or in combination with one or more of the first through third aspects, each PDSCH of the plurality of PDSCHs is associated with a corresponding MCS, a corresponding RV, and a corresponding SLIV.

In a fifth aspect, alone or in combination with one or more of the first through fourth aspects, each SPS occasion is associated with a maximum quantity of PDSCHs.

In a sixth aspect, alone or in combination with one or more of the first through fifth aspects, process 2100 further includes transmitting (e.g., using communication manager 150 and/or transmission component 2504) an indication associated with skipping one or more PDSCHs of the plurality of PDSCHs within the at least one SPS occasion, and refraining from transmitting (e.g., using communication manager 150 and/or scheduling component 2508, depicted in FIG. 25) during the one or more PDSCHs.

In a seventh aspect, alone or in combination with one or more of the first through sixth aspects, process 2100 further includes transmitting (e.g., using communication manager 150 and/or transmission component 2504) an indication associated with adding one or more additional PDSCHs within the at least one SPS occasion, and transmitting (e.g., using communication manager 150 and/or transmission component 2504) during the one or more additional PDSCHs.

In an eighth aspect, alone or in combination with one or more of the first through seventh aspects, process 2100 further includes transmitting (e.g., using communication manager 150 and/or transmission component 2504) an indication associated with modifying a property of one or more PDSCHs of the plurality of PDSCHs within the at least one SPS occasion, and transmitting (e.g., using communication manager 150 and/or transmission component 2504) during the one or more PDSCHs based on the modified property.

In a ninth aspect, alone or in combination with one or more of the first through eighth aspects, process 2100 further includes receiving (e.g., using communication manager 150 and/or reception component 2502, depicted in FIG. 25) a plurality of acknowledgement signals, associated with the plurality of packets, multiplexed into a single PUCCH.

In a tenth aspect, alone or in combination with one or more of the first through ninth aspects, process 2100 further includes determining (e.g., using communication manager 150 and/or determination component 2510, depicted in FIG. 25) the configuration based, at least in part, on one or more traffic statistics associated with the plurality of packets.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

Figure 22:
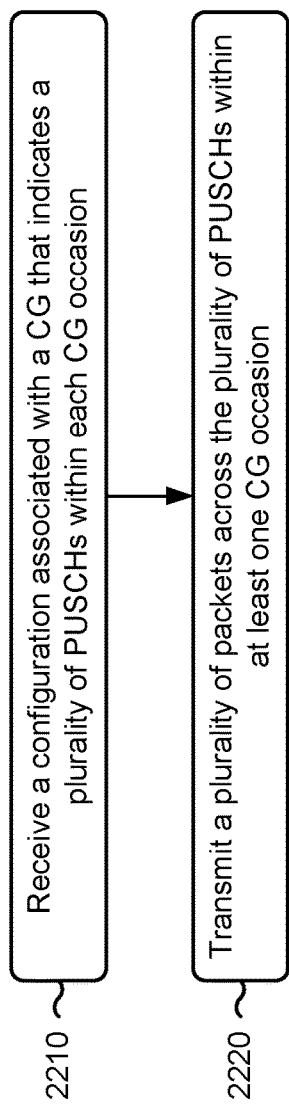
FIGS. 22 and 23 are diagrams illustrating example processes associated with using multiple channels for CG occasions, in accordance with the present disclosure.

FIG. 22 is a diagram illustrating an example process 2200 performed, for example, by a UE, in accordance with the present disclosure. Example process 2200 is an example where the UE (e.g., UE 120 and/or apparatus 2400 of FIG. 24) performs operations associated with using multiple channels within CG occasions.

As shown in FIG. 22, in some aspects, process 2200 may include receiving a configuration associated with a CG that indicates a plurality of PUSCHs within each CG occasion for the UE (block 2210). For example, the UE (e.g., using communication manager 140 and/or reception component 2402, depicted in FIG. 24) may receive a configuration associated with a CG that indicates a plurality of PUSCHs within each CG occasion for the UE, as described herein.

As further shown in FIG. 22, in some aspects, process 2200 may include transmitting a plurality of packets across the plurality of PUSCHs within at least one CG occasion for the UE (block 2220). For example, the UE (e.g., using communication manager 140 and/or transmission component 2404, depicted in FIG. 24) may transmit a plurality of packets across the plurality of PUSCHs within at least one CG occasion for the UE, as described herein.

Process 2200 may include additional aspects, such as any single aspect or any combination of aspects described below and/or in connection with one or more other processes described elsewhere herein.

In a first aspect, the plurality of packets comprises one or more XR packets, one or more VR packets, or a combination thereof.

In a second aspect, alone or in combination with the first aspect, process 2200 further includes receiving (e.g., using communication manager 140 and/or reception component 2402) a configuration associated with a DG for retransmitting one or more packets of the plurality of packets, and retransmitting (e.g., using communication manager 140 and/or transmission component 2404) the one or more packets according to the DG.

In a third aspect, alone or in combination with one or more of the first and second aspects, each PUSCH of the plurality of PUSCHs is associated with a single TB.

In a fourth aspect, alone or in combination with one or more of the first through third aspects, each PUSCH of the plurality of PUSCHs is associated with a corresponding MCS and a corresponding quantity of RBs.

In a fifth aspect, alone or in combination with one or more of the first through fourth aspects, each CG occasion is associated with a maximum quantity of PUSCHs.

In a sixth aspect, alone or in combination with one or more of the first through fifth aspects, process 2200 further includes transmitting (e.g., using communication manager 140 and/or transmission component 2404) an indication associated with skipping one or more PUSCHs of the plurality of PUSCHs within the at least one CG occasion, and refraining from transmitting (e.g., using communication manager 140 and/or transmission component 2404) during the one or more PUSCHs.

In a seventh aspect, alone or in combination with one or more of the first through sixth aspects, process 2200 further includes transmitting (e.g., using communication manager 140 and/or transmission component 2404) a request associated with adding one or more additional PUSCHs within the at least one CG occasion, receiving (e.g., using communication manager 140 and/or reception component 2402) an approval of the request, and transmitting (e.g., using communication manager 140 and/or transmission component 2404) during the one or more additional PUSCHs.

In an eighth aspect, alone or in combination with one or more of the first through seventh aspects, process 2200 further includes transmitting (e.g., using communication manager 140 and/or transmission component 2404) a request associated with modifying a property of one or more PUSCHs of the plurality of PUSCHs within the at least one CG occasion, receiving (e.g., using communication manager 140 and/or reception component 2402) an approval of the request, and transmitting (e.g., using communication manager 140 and/or transmission component 2404) during the one or more PUSCHs based on the modified property.

In a ninth aspect, alone or in combination with one or more of the first through eighth aspects, process 2200 further includes transmitting (e.g., using communication manager 140 and/or transmission component 2404) a request for the configuration based, at least in part, on one or more traffic statistics associated with the plurality of packets.

Although FIG. 22 shows example blocks of process 2200, in some aspects, process 2200 may include additional blocks, fewer blocks, different blocks, or differently arranged blocks than those depicted in FIG. 22. Additionally, or alternatively, two or more of the blocks of process 2200 may be performed in parallel.

Figure 23:
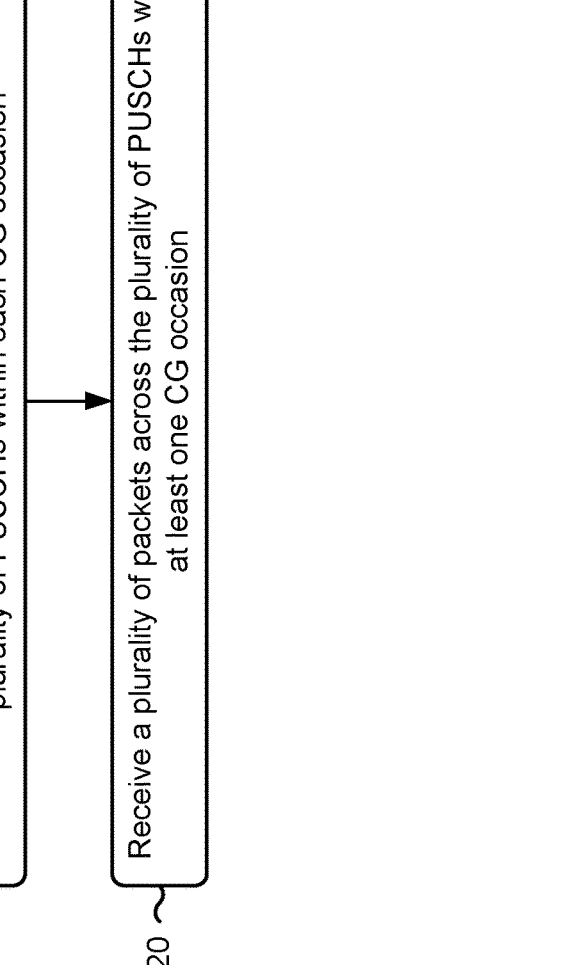

FIG. 23 is a diagram illustrating an example process 2300 performed, for example, by a network entity, in accordance with the present disclosure. Example process 2300 is an example where the network entity (e.g., network entity 1601 and/or apparatus 2500 of FIG. 25) performs operations associated with using multiple channels within CG occasions.

As shown in FIG. 23, in some aspects, process 2300 may include transmitting a configuration associated with a CG that indicates a plurality of PUSCHs within each CG occasion for a UE (e.g., UE 120 and/or apparatus 2400 of FIG. 24) (block 2310). For example, the network entity (e.g., using communication manager 150 and/or transmission component 2504, depicted in FIG. 25) may transmit a configuration associated with a CG that indicates a plurality of PUSCHs within each CG occasion for a UE, as described herein.

As further shown in FIG. 23, in some aspects, process 2300 may include receiving a plurality of packets across the plurality of PUSCHs within at least one CG occasion for the UE (block 2320). For example, the network entity (e.g., using communication manager 150 and/or reception component 2502, depicted in FIG. 25) may receive a plurality of packets across the plurality of PUSCHs within at least one CG occasion for the UE, as described herein.

Process 2300 may include additional aspects, such as any single aspect or any combination of aspects described below and/or in connection with one or more other processes described elsewhere herein.

In a first aspect, the plurality of packets comprises one or more XR packets, one or more VR packets, or a combination thereof.

In a second aspect, alone or in combination with the first aspect, process 2300 further includes transmitting (e.g., using communication manager 150 and/or transmission component 2504) a configuration associated with a DG for retransmitting one or more packets of the plurality of packets, and receiving (e.g., using communication manager 150 and/or reception component 2502) one or more retransmissions of the one or more packets according to the DG.

In a third aspect, alone or in combination with one or more of the first and second aspects, each PUSCH of the plurality of PUSCHs is associated with a single TB.

In a fourth aspect, alone or in combination with one or more of the first through third aspects, each PUSCH of the plurality of PUSCHs is associated with a corresponding MCS and a corresponding quantity of RBs.

In a fifth aspect, alone or in combination with one or more of the first through fourth aspects, each CG occasion is associated with a maximum quantity of PUSCHs.

In a sixth aspect, alone or in combination with one or more of the first through fifth aspects, process 2300 further includes receiving (e.g., using communication manager 150 and/or reception component 2502) an indication associated with skipping one or more PUSCHs of the plurality of PUSCHs within the at least one CG occasion, and refraining from monitoring (e.g., using communication manager 150 and/or scheduling component 2508, depicted in FIG. 25) during the one or more PUSCHs.

In a seventh aspect, alone or in combination with one or more of the first through sixth aspects, process 2300 further includes receiving (e.g., using communication manager 150 and/or reception component 2502) a request associated with adding one or more additional PUSCHs within the at least one CG occasion, transmitting (e.g., using communication manager 150 and/or transmission component 2504) an approval of the request, and receiving (e.g., using communication manager 150 and/or reception component 2502) during the one or more additional PUSCHs.

In an eighth aspect, alone or in combination with one or more of the first through seventh aspects, process 2300 further includes receiving (e.g., using communication manager 150 and/or reception component 2502) a request associated with modifying a property of one or more PUSCHs of the plurality of PUSCHs within the at least one CG occasion, transmitting (e.g., using communication manager 150 and/or transmission component 2504) an approval of the request, and receiving (e.g., using communication manager 150 and/or reception component 2502) during the one or more PUSCHs based on the modified property.

In a ninth aspect, alone or in combination with one or more of the first through eighth aspects, the configuration indicates a periodicity of 16.67 ms or 8.33 ms.

Although FIG. 23 shows example blocks of process 2300, in some aspects, process 2300 may include additional blocks, fewer blocks, different blocks, or differently arranged blocks than those depicted in FIG. 23. Additionally, or alternatively, two or more of the blocks of process 2300 may be performed in parallel.

FIG. 24 is a diagram of an example apparatus 2400 for wireless communication. The apparatus 2400 may be a UE, or a UE may include the apparatus 2400. In some aspects, the apparatus 2400 includes a reception component 2402 and a transmission component 2404, which may be in communication with one another (for example, via one or more buses and/or one or more other components). As shown, the apparatus 2400 may communicate with another apparatus 2406 (such as a UE, a base station, or another wireless communication device) using the reception component 2402 and the transmission component 2404. As further shown, the apparatus 2400 may include the communication manager 140. The communication manager 140 may include a monitoring component 2408, among other examples.

In some aspects, the apparatus 2400 may be configured to perform one or more operations described herein in connection with FIGS. 4-7. Additionally, or alternatively, the apparatus 2400 may be configured to perform one or more processes described herein, such as process 2000 of FIG. 20, process 2200 of FIG. 22, or a combination thereof. In some aspects, the apparatus 2400 and/or one or more components shown in FIG. 24 may include one or more components of the UE described in connection with FIG. 2. Additionally, or alternatively, one or more components shown in FIG. 24 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2402 may receive communications, such as reference signals, control information, data communications, or a combination thereof, from the apparatus 2406. The reception component 2402 may provide received communications to one or more other components of the apparatus 2400. In some aspects, the reception component 2402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2400. In some aspects, the reception component 2402 may include one or more antennas, a modem, a demodulator, a MIMO detector, a receive processor, a controller/processor, a memory, or a combination thereof, of the UE described in connection with FIG. 2.

The transmission component 2404 may transmit communications, such as reference signals, control information, data communications, or a combination thereof, to the apparatus 2406. In some aspects, one or more other components of the apparatus 2400 may generate communications and may provide the generated communications to the transmission component 2404 for transmission to the apparatus 2406. In some aspects, the transmission component 2404 may perform signal processing on the generated communications (such as filtering, amplification, modulation, digital-to-analog conversion, multiplexing, interleaving, mapping, or encoding, among other examples), and may transmit the processed signals to the apparatus 2406. In some aspects, the transmission component 2404 may include one or more antennas, a modem, a modulator, a transmit MIMO processor, a transmit processor, a controller/processor, a memory, or a combination thereof, of the UE described in connection with FIG. 2. In some aspects, the transmission component 2404 may be co-located with the reception component 2402 in a transceiver.

In some aspects, the reception component 2402 may receive (e.g., from the apparatus 2406, such as a network entity) a configuration associated with SPS that indicates a plurality of PDSCHs within each SPS occasion for the apparatus 2400. Further, the reception component 2402 may receive (e.g., from the apparatus 2406) a plurality of packets across the plurality of PDSCHs within at least one SPS occasion for the apparatus 2400. In some aspects, the transmission component 2404 may transmit (e.g., to the apparatus 2406) a plurality of acknowledgement signals, associated with the plurality of packets, multiplexed into a single PUCCH.

In some aspects, the reception component 2402 may receive (e.g., from the apparatus 2406) a configuration associated with a DG for retransmitting one or more packets of the plurality of packets. Accordingly, the reception component 2402 may receive (e.g., from the apparatus 2406) one or more retransmissions of the one or more packets according to the DG.

In some aspects, the reception component 2402 may receive (e.g., from the apparatus 2406) an indication associated with skipping one or more PDSCHs of the plurality of PDSCHs within the at least one SPS occasion. Accordingly, the monitoring component 2408 may refrain from monitoring during the one or more PDSCHs. The monitoring component 2408 may include one or more antennas, a modem, a demodulator, a MIMO detector, a receive processor, a controller/processor, a memory, or a combination thereof, of the UE described in connection with FIG. 2.

In some aspects, the reception component 2402 may receive (e.g., from the apparatus 2406) an indication associated with adding one or more additional PDSCHs within the at least one SPS occasion. Accordingly, the monitoring component 2408 may monitor during the one or more additional PDSCHs.

In some aspects, the reception component 2402 may receive (e.g., from the apparatus 2406) an indication associated with modifying a property of one or more PDSCHs of the plurality of PDSCHs within the at least one SPS occasion. Accordingly, the monitoring component 2408 may monitor during the one or more PDSCHs based on the modified property.

Additionally, or alternatively, the reception component 2402 may receive (e.g., from the apparatus 2406, such as a network entity) a configuration associated with a CG that indicates a plurality of PUSCHs within each CG occasion for the apparatus 2400. Accordingly, the transmission component 2404 may transmit (e.g., to the apparatus 2406) a plurality of packets across the plurality of PUSCHs within at least one CG occasion for the apparatus 2400. In some aspects, the transmission component 2404 may transmit (e.g., to the apparatus 2406) a request for the configuration based, at least in part, on one or more traffic statistics associated with the plurality of packets.

In some aspects, the reception component 2402 may receive (e.g., from the apparatus 2406) a configuration associated with a DG for retransmitting one or more packets of the plurality of packets. Accordingly, the transmission component 2404 may retransmit (e.g., to the apparatus 2406) the one or more packets according to the DG.

In some aspects, the transmission component 2404 may transmit (e.g., to the apparatus 2406) an indication associated with skipping one or more PUSCHs of the plurality of PUSCHs within the at least one CG occasion. Accordingly, the transmission component 2404 may refrain from transmitting during the one or more PUSCHs.

In some aspects, the transmission component 2404 may transmit (e.g., to the apparatus 2406) a request associated with adding one or more additional PUSCHs within the at least one CG occasion. The reception component 2402 may receive (e.g., from the apparatus 2406) an approval of the request such that the transmission component 2404 transmits (e.g., to the apparatus 2406) during the one or more additional PUSCHs.

In some aspects, the transmission component 2404 may transmit (e.g., to the apparatus 2406) a request associated with modifying a property of one or more PUSCHs of the plurality of PUSCHs within the at least one CG occasion. The reception component 2402 may receive (e.g., from the apparatus 2406) an approval of the request such that the transmission component 2404 transmits (e.g., to the apparatus 2406) during the one or more PUSCHs based on the modified property.

The number and arrangement of components shown in FIG. 24 are provided as an example. In practice, there may be additional components, fewer components, different components, or differently arranged components than those shown in FIG. 24. Furthermore, two or more components shown in FIG. 24 may be implemented within a single component, or a single component shown in FIG. 24 may be implemented as multiple, distributed components. Additionally, or alternatively, a set of (one or more) components shown in FIG. 24 may perform one or more functions described as being performed by another set of components shown in FIG. 24.

FIG. 25 is a diagram of an example apparatus 2500 for wireless communication. The apparatus 2500 may be a network entity, or a network entity may include the apparatus 2500. In some aspects, the apparatus 2500 includes a reception component 2502 and a transmission component 2504, which may be in communication with one another (for example, via one or more buses and/or one or more other components). As shown, the apparatus 2500 may communicate with another apparatus 2506 (such as a UE, a base station, or another wireless communication device) using the reception component 2502 and the transmission component 2504. As further shown, the apparatus 2500 may include the communication manager 150. The communication manager 150 may include one or more of a scheduling component 2508 and/or a determination component 2510, among other examples.

In some aspects, the apparatus 2500 may be configured to perform one or more operations described herein in connection with FIGS. 16-19. Additionally, or alternatively, the apparatus 2500 may be configured to perform one or more processes described herein, such as process 2100 of FIG. 21, process 2300 of FIG. 23, or a combination thereof. In some aspects, the apparatus 2500 and/or one or more components shown in FIG. 25 may include one or more components of the base station described in connection with FIG. 2. Additionally, or alternatively, one or more components shown in FIG. 25 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2502 may receive communications, such as reference signals, control information, data communications, or a combination thereof, from the apparatus 2506. The reception component 2502 may provide received communications to one or more other components of the apparatus 2500. In some aspects, the reception component 2502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2500. In some aspects, the reception component 2502 may include one or more antennas, a modem, a demodulator, a MIMO detector, a receive processor, a controller/processor, a memory, or a combination thereof, of the base station described in connection with FIG. 2.

The transmission component 2504 may transmit communications, such as reference signals, control information, data communications, or a combination thereof, to the apparatus 2506. In some aspects, one or more other components of the apparatus 2500 may generate communications and may provide the generated communications to the transmission component 2504 for transmission to the apparatus 2506. In some aspects, the transmission component 2504 may perform signal processing on the generated communications (such as filtering, amplification, modulation, digital-to-analog conversion, multiplexing, interleaving, mapping, or encoding, among other examples), and may transmit the processed signals to the apparatus 2506. In some aspects, the transmission component 2504 may include one or more antennas, a modem, a modulator, a transmit MIMO processor, a transmit processor, a controller/processor, a memory, or a combination thereof, of the base station described in connection with FIG. 2. In some aspects, the transmission component 2504 may be co-located with the reception component 2502 in a transceiver.

In some aspects, the transmission component 2504 may transmit (e.g., to the apparatus 2506, such as a UE) a configuration associated with SPS that indicates a plurality of PDSCHs within each SPS occasion for the apparatus

2506. Accordingly, the transmission component 2504 may transmit a plurality of packets across the plurality of PDSCHs within at least one SPS occasion for the apparatus 2506. In some aspects, the determination component 2510 may determine the configuration based, at least in part, on one or more traffic statistics associated with the plurality of packets. The determination component may include a MIMO detector, a receive processor, a transmit MIMO processor, a transmit processor, a controller/processor, a memory, or a combination thereof, of the base station described in connection with FIG. 2. In some aspects, the reception component 2502 may receive (e.g., from the apparatus 2506) a plurality of acknowledgement signals, associated with the plurality of packets, multiplexed into a single PUCCH.

In some aspects, the transmission component 2504 may transmit (e.g., to the apparatus 2506) a configuration associated with a DG for retransmitting one or more packets of the plurality of packets. Accordingly, the transmission component 2504 may retransmit (e.g., to the apparatus 2506) the one or more packets according to the DG.

In some aspects, the transmission component 2504 may transmit (e.g., to the apparatus 2506) an indication associated with skipping one or more PDSCHs of the plurality of PDSCHs within the at least one SPS occasion. Accordingly, the scheduling component 2508 may refrain from transmitting during the one or more PDSCHs. The scheduling component 2508 may include a modem, a modulator, a transmit MIMO processor, a transmit processor, a controller/processor, a memory, or a combination thereof, of the base station described in connection with FIG. 2.

In some aspects, the transmission component 2504 may transmit (e.g., to the apparatus 2506) an indication associated with adding one or more additional PDSCHs within the at least one SPS occasion. Accordingly, the transmission component 2504 may transmit (e.g., to the apparatus 2506) during the one or more additional PDSCHs.

In some aspects, the transmission component 2504 may transmit (e.g., to the apparatus 2506) an indication associated with modifying a property of one or more PDSCHs of the plurality of PDSCHs within the at least one SPS occasion. Accordingly, the transmission component 2504 may transmit (e.g., to the apparatus 2506) during the one or more PDSCHs based on the modified property.

Additionally, or alternatively, the transmission component 2504 may transmit (e.g., to the apparatus 2506, such as a UE) a configuration associated with a CG that indicates a plurality of PUSCHs within each CG occasion for the apparatus 2506. Accordingly, the reception component 2502 may receive a plurality of packets across the plurality of PUSCHs within at least one CG occasion for the apparatus 2506.

In some aspects, the transmission component 2504 may transmit (e.g., to the apparatus 2506) a configuration associated with a DG for retransmitting one or more packets of the plurality of packets. Accordingly, the reception component 2502 may receive (e.g., from the apparatus 2506) one or more retransmissions of the one or more packets according to the DG.

In some aspects, the reception component 2502 may receive (e.g., from the apparatus 2506) an indication associated with skipping one or more PUSCHs of the plurality of PUSCHs within the at least one CG occasion. Accordingly, the scheduling component 2508 may refrain from monitoring during the one or more PUSCHs.

In some aspects, the reception component 2502 may receive (e.g., from the apparatus 2506) a request associated with adding one or more additional PUSCHs within the at least one CG occasion. The transmission component 2504 may transmit (to the apparatus 2506) an approval of the request such that the reception component 2502 receives (e.g., from the apparatus 2506) during the one or more additional PUSCHs.

In some aspects, the reception component 2502 may receive (e.g., from the apparatus 2506) a request associated with modifying a property of one or more PUSCHs of the plurality of PUSCHs within the at least one CG occasion. The transmission component 2504 may transmit (e.g., to the apparatus 2506) an approval of the request such that the reception component 2502 receives (e.g., from the apparatus 2506) during the one or more PUSCHs based on the modified property.

The number and arrangement of components shown in FIG. 25 are provided as an example. In practice, there may be additional components, fewer components, different components, or differently arranged components than those shown in FIG. 25. Furthermore, two or more components shown in FIG. 25 may be implemented within a single component, or a single component shown in FIG. 25 may be implemented as multiple, distributed components. Additionally, or alternatively, a set of (one or more) components shown in FIG. 25 may perform one or more functions described as being performed by another set of components shown in FIG. 25.

The following provides an overview of some Aspects of the present disclosure:

Aspect 1: A method of wireless communication performed by a user equipment (UE), comprising: receiving a configuration associated with semi-persistent scheduling (SPS) that indicates a plurality of physical downlink shared channels (PDSCHs) within each SPS occasion for the UE; and receiving a plurality of packets across the plurality of PDSCHs within at least one SPS occasion for the UE.

Aspect 2: The method of Aspect 1, wherein the plurality of packets comprises one or more extended reality packets, one or more virtual reality packets, or a combination thereof.

Aspect 3: The method of any of Aspects 1 through 2, further comprising: receiving a configuration associated with a dynamic grant (DG) for retransmitting one or more packets of the plurality of packets; and receiving one or more retransmissions of the one or more packets according to the DG.

Aspect 4: The method of any of Aspects 1 through 3, wherein each PDSCH of the plurality of PDSCHs is associated with a single transport block.

Aspect 5: The method of any of Aspects 1 through 4, wherein each PDSCH of the plurality of PDSCHs is associated with a corresponding modulation and coding scheme, a corresponding redundancy version, and a corresponding start and length indicator value.

Aspect 6: The method of any of Aspects 1 through 5, wherein each SPS occasion is associated with a maximum quantity of PDSCHs.

Aspect 7: The method of any of Aspects 1 through 6, further comprising: receiving an indication associated with skipping one or more PDSCHs of the plurality of PDSCHs within the at least one SPS occasion; and refraining from monitoring during the one or more PDSCHs.

Aspect 8: The method of any of Aspects 1 through 7, further comprising: receiving an indication associated with adding one or more additional PDSCHs within the at least one SPS occasion; and monitoring during the one or more additional PDSCHs.

Aspect 9: The method of any of Aspects 1 through 8, further comprising: receiving an indication associated with modifying a property of one or more PDSCHs of the plurality of PDSCHs within the at least one SPS occasion; and monitoring during the one or more PDSCHs based on the modified property.

Aspect 10: The method of any of Aspects 1 through 9, further comprising: transmitting a plurality of acknowledgement signals, associated with the plurality of packets, multiplexed into a single physical uplink control channel.

Aspect 11: The method of any of Aspects 1 through 10, wherein the configuration indicates a periodicity of 16.67 milliseconds (ms) or 8.33 ms.

Aspect 12: A method of wireless communication performed by a network entity, comprising: transmitting a configuration associated with semi-persistent scheduling (SPS) that indicates a plurality of physical downlink shared channels (PDSCHs) within each SPS occasion for a user equipment (UE); and transmitting a plurality of packets across the plurality of PDSCHs within at least one SPS occasion for the UE.

Aspect 13: The method of Aspect 12, wherein the plurality of packets comprises one or more extended reality packets, one or more virtual reality packets, or a combination thereof.

Aspect 14: The method of any of Aspects 12 through 13, further comprising: transmitting a configuration associated with a dynamic grant (DG) for retransmitting one or more packets of the plurality of packets; and retransmitting the one or more packets according to the DG.

Aspect 15: The method of any of Aspects 12 through 14, wherein each PDSCH of the plurality of PDSCHs is associated with a single transport block.

Aspect 16: The method of any of Aspects 12 through 15, wherein each PDSCH of the plurality of PDSCHs is associated with a corresponding modulation and coding scheme, a corresponding redundancy version, and a corresponding start and length indicator value.

Aspect 17: The method of any of Aspects 12 through 16, wherein each SPS occasion is associated with a maximum quantity of PDSCHs.

Aspect 18: The method of any of Aspects 12 through 17, further comprising: transmitting an indication associated with skipping one or more PDSCHs of the plurality of PDSCHs within the at least one SPS occasion; and refraining from transmitting during the one or more PDSCHs.

Aspect 19: The method of any of Aspects 12 through 18, further comprising: transmitting an indication associated with adding one or more additional PDSCHs within the at least one SPS occasion; and transmitting during the one or more additional PDSCHs.

Aspect 20: The method of any of Aspects 12 through 19, further comprising: transmitting an indication associated with modifying a property of one or more PDSCHs of the plurality of PDSCHs within the at least one SPS occasion; and transmitting during the one or more PDSCHs based on the modified property.

Aspect 21: The method of any of Aspects 12 through 20, further comprising: receiving a plurality of acknowledgement signals, associated with the plurality of packets, multiplexed into a single physical uplink control channel.

Aspect 22: The method of any of Aspects 12 through 21, further comprising: determining the configuration based, at least in part, on one or more traffic statistics associated with the plurality of packets.

Aspect 23: A method of wireless communication performed by a user equipment (UE), comprising: receiving a configuration associated with a configured grant (CG) that indicates a plurality of physical uplink shared channels (PUSCHs) within each CG occasion for the UE; and transmitting a plurality of packets across the plurality of PUSCHs within at least one CG occasion for the UE.

Aspect 24: The method of Aspect 23, wherein the plurality of packets comprises one or more extended reality packets, one or more virtual reality packets, or a combination thereof.

Aspect 25: The method of any of Aspects 23 through 24, further comprising: receiving a configuration associated with a dynamic grant (DG) for retransmitting one or more packets of the plurality of packets; and retransmitting the one or more packets according to the DG.

Aspect 26: The method of any of Aspects 23 through 25, wherein each PUSCH of the plurality of PUSCHs is associated with a single transport block.

Aspect 27: The method of any of Aspects 23 through 26, wherein each PUSCH of the plurality of PUSCHs is associated with a corresponding modulation and coding scheme and a corresponding quantity of resource blocks.

Aspect 28: The method of any of Aspects 23 through 27, wherein each CG occasion is associated with a maximum quantity of PUSCHs.

Aspect 29: The method of any of Aspects 23 through 28, further comprising: transmitting an indication associated with skipping one or more PUSCHs of the plurality of PUSCHs within the at least one CG occasion; and refraining from transmitting during the one or more PUSCHs.

Aspect 30: The method of any of Aspects 23 through 29, further comprising: transmitting a request associated with adding one or more additional PUSCHs within the at least one CG occasion; receiving an approval of the request; and transmitting during the one or more additional PUSCHs.

Aspect 31: The method of any of Aspects 23 through 30, further comprising: transmitting a request associated with modifying a property of one or more PUSCHs of the plurality of PUSCHs within the at least one CG occasion; receiving an approval of the request; and transmitting during the one or more PUSCHs based on the modified property.

Aspect 32: The method of any of Aspects 23 through 31, further comprising: transmitting a request for the configuration based, at least in part, on one or more traffic statistics associated with the plurality of packets.

Aspect 33: A method of wireless communication performed by a network entity, comprising: transmitting a configuration associated with a configured grant (CG) that indicates a plurality of physical uplink shared channels (PUSCHs) within each CG occasion for a user equipment (UE); and receiving a plurality of packets across the plurality of PUSCHs within at least one CG occasion for the UE.

Aspect 34: The method of Aspect 33, wherein the plurality of packets comprises one or more extended reality packets, one or more virtual reality packets, or a combination thereof.

Aspect 35: The method of any of Aspects 33 through 34, further comprising: transmitting a configuration associated with a dynamic grant (DG) for retransmitting one or more packets of the plurality of packets; and receiving one or more retransmissions of the one or more packets according to the DG.

Aspect 36: The method of any of Aspects 33 through 35, wherein each PUSCH of the plurality of PUSCHs is associated with a single transport block.

Aspect 37: The method of any of Aspects 33 through 36, wherein each PUSCH of the plurality of PUSCHs is associated with a corresponding modulation and coding scheme and a corresponding quantity of resource blocks.

Aspect 38: The method of any of Aspects 33 through 37, wherein each CG occasion is associated with a maximum quantity of PUSCHs.

Aspect 39: The method of any of Aspects 33 through 38, further comprising: receiving an indication associated with skipping one or more PUSCHs of the plurality of PUSCHs within the at least one CG occasion; and refraining from monitoring during the one or more PUSCHs.

Aspect 40: The method of any of Aspects 33 through 39, further comprising: receiving a request associated with adding one or more additional PUSCHs within the at least one CG occasion; transmitting an approval of the request; and receiving during the one or more additional PUSCHs.

Aspect 41: The method of any of Aspects 33 through 40, further comprising: receiving a request associated with modifying a property of one or more PUSCHs of the plurality of PUSCHs within the at least one CG occasion; transmitting an approval of the request; and receiving during the one or more PUSCHs based on the modified property.

Aspect 42: The method of any of Aspects 33 through 41, wherein the configuration indicates a periodicity of 16.67 milliseconds (ms) or 8.33 ms.

Aspect 43: An apparatus for wireless communication at a device, comprising a processor; memory coupled with the processor; and instructions stored in the memory and executable by the processor to cause the apparatus to perform the method of one or more of Aspects 1-11.

Aspect 44: A device for wireless communication, comprising a memory and one or more processors coupled to the memory, the one or more processors configured to perform the method of one or more of Aspects 1-11.

Aspect 45: An apparatus for wireless communication, comprising at least one means for performing the method of one or more of Aspects 1-11.

Aspect 46: A non-transitory computer-readable medium storing code for wireless communication, the code comprising instructions executable by a processor to perform the method of one or more of Aspects 1-11.

Aspect 47: A non-transitory computer-readable medium storing a set of instructions for wireless communication, the set of instructions comprising one or more instructions that, when executed by one or more processors of a device, cause the device to perform the method of one or more of Aspects 1-11.

Aspect 48: An apparatus for wireless communication at a device, comprising a processor; memory coupled with the processor; and instructions stored in the memory and executable by the processor to cause the apparatus to perform the method of one or more of Aspects 12-22.

Aspect 49: A device for wireless communication, comprising a memory and one or more processors coupled to the memory, the one or more processors configured to perform the method of one or more of Aspects 12-22.

Aspect 50: An apparatus for wireless communication, comprising at least one means for performing the method of one or more of Aspects 12-22.

Aspect 51: A non-transitory computer-readable medium storing code for wireless communication, the code comprising instructions executable by a processor to perform the method of one or more of Aspects 12-22.

Aspect 52: A non-transitory computer-readable medium storing a set of instructions for wireless communication, the set of instructions comprising one or more instructions that, when executed by one or more processors of a device, cause the device to perform the method of one or more of Aspects 12-22.

Aspect 53: An apparatus for wireless communication at a device, comprising a processor; memory coupled with the processor; and instructions stored in the memory and executable by the processor to cause the apparatus to perform the method of one or more of Aspects 23-32.

Aspect 54: A device for wireless communication, comprising a memory and one or more processors coupled to the memory, the one or more processors configured to perform the method of one or more of Aspects 23-32.

Aspect 55: An apparatus for wireless communication, comprising at least one means for performing the method of one or more of Aspects 23-32.

Aspect 56: A non-transitory computer-readable medium storing code for wireless communication, the code comprising instructions executable by a processor to perform the method of one or more of Aspects 23-32.

Aspect 57: A non-transitory computer-readable medium storing a set of instructions for wireless communication, the set of instructions comprising one or more instructions that, when executed by one or more processors of a device, cause the device to perform the method of one or more of Aspects 23-32.

Aspect 58: An apparatus for wireless communication at a device, comprising a processor; memory coupled with the processor; and instructions stored in the memory and executable by the processor to cause the apparatus to perform the method of one or more of Aspects 33-42.

Aspect 59: A device for wireless communication, comprising a memory and one or more processors coupled to the memory, the one or more processors configured to perform the method of one or more of Aspects 33-42.

Aspect 60: An apparatus for wireless communication, comprising at least one means for performing the method of one or more of Aspects 33-42.

Aspect 61: A non-transitory computer-readable medium storing code for wireless communication, the code comprising instructions executable by a processor to perform the method of one or more of Aspects 33-42.

Aspect 62: A non-transitory computer-readable medium storing a set of instructions for wireless communication, the set of instructions comprising one or more instructions that, when executed by one or more processors of a device, cause the device to perform the method of one or more of Aspects 33-42.

Aspect 63: A method of wireless communication performed by a user equipment (UE), comprising: receiving an indication of a timing of discontinuous reception (DRX) on-duration occasions that is associated with a combination of a first DRX cycle with a first periodicity for a first data flow and a second DRX cycle with a second periodicity for a second data flow; and monitoring for communications of the first data flow and the second data flow at the DRX on-duration occasions.

Aspect 64: The method of Aspect 63, wherein the indication identifies the first DRX cycle or the second DRX cycle as an anchor cycle, and wherein DRX on-duration occasions of the anchor cycle include information that indicates on-duration occasions of a non-anchor DRX cycle.

Aspect 65: The method of Aspect 64, wherein the anchor cycle has a periodicity that is a minimum of the first periodicity and the second periodicity.

Aspect 66: The method of Aspect 64, wherein the anchor cycle has a periodicity that is a maximum of the first periodicity and the second periodicity.

Aspect 67: The method of any of Aspects 63-66, wherein downlink control information in a DRX on-duration occasion of the first DRX cycle indicates a location of a DRX on-duration occasion of the second DRX cycle.

Aspect 68: The method of any of Aspects 63-67, wherein the timing is based at least in part on a first packet delay budget (PDB) for the first DRX cycle, the first periodicity, a second PDB for the second DRX cycle, and the second periodicity.

Aspect 69: The method of Aspect 68, wherein the timing is based at least in part on a minimum of the first PDB×the first periodicity and the second PDB×the second periodicity, divided by a minimum PDB that is a PDB of a flow minimum of the first PDB×the first periodicity and the second PDB×the second periodicity.

Aspect 70: The method of any of Aspects 63-69, wherein the timing of the DRX on-duration occasions includes a non-uniform DRX cycle.

Aspect 71: The method of any of Aspects 63-70, wherein the timing is specified for an epoch of multiple connected mode DRX cycles.

Aspect 72: The method of Aspect 63, wherein one or more of the first DRX cycle or the second DRX cycle correspond to a periodicity of extended reality traffic.

Aspect 73: The method of any of Aspects 63-72, wherein one or more of the first data flow or the second data flow includes extended reality traffic.

Aspect 74: The method of any of Aspects 63-73, further comprising monitoring for communications one or more slots before or after a DRX on-duration occasion.

Aspect 75: A method of wireless communication performed by a network entity, comprising: transmitting an indication of a timing of discontinuous reception (DRX) on-duration occasions that is associated with a combination of a first DRX cycle with a first periodicity for a first data flow and a second DRX cycle with a second periodicity for a second data flow; and transmitting communications of the first data flow and the second data flow at the DRX on-duration occasions.

Aspect 76: The method of Aspect 75, wherein the indication identifies the first DRX cycle or the second DRX cycle as an anchor cycle, and wherein DRX on-duration occasions of the anchor cycle indicate on-duration occasions of a non-anchor DRX cycle.

Aspect 77: The method of Aspect 76, wherein the anchor cycle has a periodicity that is a minimum of the first periodicity and the second periodicity.

Aspect 78: The method of any of Aspects 75-77, wherein downlink control information in a DRX on-duration occasion of the first DRX cycle indicates a location of a DRX on-duration occasion of the second DRX cycle.

Aspect 79: The method of any of Aspects 75-78, wherein the timing is based at least in part on a first packet delay budget (PDB) for the first DRX cycle, the first periodicity, a second PDB for the second DRX cycle, and the second periodicity.

Aspect 80: The method of Aspect 79, wherein the timing is based at least in part on a minimum of the first PDB×the first periodicity and the second PDB×the second periodicity, divided by a minimum PDB that is a PDB of a flow minimum of the first PDB×the first periodicity and the second PDB×the second periodicity.

Aspect 81: The method of any of Aspects 75-80, wherein the timing of the DRX on-duration occasions includes a non-uniform DRX cycle.

Aspect 82: The method of any of Aspects 75-81, wherein the timing is specified for an epoch of multiple connected mode DRX cycles.

Aspect 83: The method of any of Aspects 75-82, wherein one or more of the first DRX cycle or the second DRX cycle correspond to a periodicity of extended reality traffic.

Aspect 84: The method of any of Aspects 75-83, wherein one or more of the first data flow or the second data flow includes extended reality traffic.

Aspect 85: A method of wireless communication performed by a user equipment (UE), comprising: receiving an indication of a timing of discontinuous reception (DRX) on-duration occasions that is associated with a greater of a first periodicity of a first DRX cycle for a first data flow or a second periodicity of a second DRX cycle for a second data flow; and monitoring for communications of the first data flow and the second data flow at the DRX on-duration occasions.

Aspect 86: The method of Aspect 85, wherein one or more of the first DRX cycle or the second DRX cycle correspond to a periodicity of extended reality traffic.

Aspect 87: The method of Aspect 85 or 86, wherein one or more of the first data flow or the second data flow includes extended reality traffic.

Aspect 88: The method of any of Aspects 85-87, wherein downlink control information in a DRX on-duration occasion of the first DRX cycle indicates a location of a DRX on-duration occasion of the second DRX cycle.

Aspect 89: A method of wireless communication performed by a network entity, comprising: transmitting an indication of a timing of discontinuous reception (DRX) on-duration occasions that is associated with a greater of a first periodicity of a first DRX cycle for a first data flow or a second periodicity of a second DRX cycle for a second data flow; and transmitting communications of the first data flow and the second data flow at the DRX on-duration occasions.

Aspect 90: The method of Aspect 89, wherein one or more of the first DRX cycle or the second DRX cycle correspond to a periodicity of extended reality traffic.

Aspect 91: The method of Aspect 89 or 90, wherein one or more of the first data flow or the second data flow includes extended reality traffic.

Aspect 92: The method of any of Aspects 89-91, wherein downlink control information in a DRX on-duration occasion of the first DRX cycle indicates a location of a DRX on-duration occasion of the second DRX cycle.

Aspect 93: An apparatus for wireless communication at a device, comprising a processor; memory coupled with the processor; and instructions stored in the memory and executable by the processor to cause the apparatus to perform the method of one or more of Aspects 63-92.

Aspect 94: A device for wireless communication, comprising a memory and one or more processors coupled to the memory, the one or more processors configured to perform the method of one or more of Aspects 63-92.

Aspect 95: An apparatus for wireless communication, comprising at least one means for performing the method of one or more of Aspects 63-92.

Aspect 96: A non-transitory computer-readable medium storing code for wireless communication, the code comprising instructions executable by a processor to perform the method of one or more of Aspects 63-92.

Aspect 97: A non-transitory computer-readable medium storing a set of instructions for wireless communication, the set of instructions comprising one or more instructions that, when executed by one or more processors of a device, cause the device to perform the method of one or more of Aspects 63-92.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
   receive a configuration associated with a configured grant (CG) that indicates a plurality of physical uplink shared channels (PUSCHs) within each CG occasion for the UE;
   transmit a request associated with modifying a property of one or more PUSCHs of the plurality of PUSCHs within at least one CG occasion; and
   transmit a plurality of packets across the plurality of PUSCHs within the at least one CG occasion for the UE based on the modified property, wherein the configuration indicates a periodicity based on a frames-per-second (fps) that characterizes traffic associated with the plurality of packets.

2. The apparatus of claim 1,
   wherein the plurality of packets comprises one or more extended reality packets, one or more virtual reality packets, or a combination thereof.

3. The apparatus of claim 1,
   wherein the one or more processors are further configured to:
   receive a configuration associated with a dynamic grant (DG) for retransmitting one or more packets of the plurality of packets; and
   retransmit the one or more packets according to the DG.

4. The apparatus of claim 1,
   wherein each PUSCH of the plurality of PUSCHs is associated with a single transport block.

5. The apparatus of claim 1,
   wherein each PUSCH of the plurality of PUSCHs is associated with a corresponding modulation and coding scheme and a corresponding quantity of resource blocks.

6. The apparatus of claim 1,
   wherein each CG occasion is associated with a maximum quantity of PUSCHs.

7. The apparatus of claim 1,
   wherein the one or more processors are further configured to:
   transmit an indication associated with skipping one or more other PUSCHs of the plurality of PUSCHs within the at least one CG occasion; and
   refrain from transmitting during the one or more other PUSCHs.

8. The apparatus of claim 1,
   wherein the one or more processors are further configured to:
   transmit a second request associated with adding one or more additional PUSCHs within the at least one CG occasion;
   receive an approval of the second request; and
   transmit during the one or more additional PUSCHs.

9. The apparatus of claim 1,
   wherein the one or more processors are further configured to:
   receive an approval of the request.

10. The apparatus of claim 1,
    wherein the one or more processors are further configured to transmit a second request for the configuration based, at least in part, on one or more traffic statistics associated with the plurality of packets.

11. An apparatus for wireless communication at a network entity, comprising:
    one or more memories; and
    one or more processors, coupled to the one or more memories, configured to:
    transmit a configuration associated with a configured grant (CG) that indicates a plurality of physical uplink shared channels (PUSCHs) within each CG occasion for a user equipment (UE);
    transmit a request associated with modifying a property of one or more PUSCHs of the plurality of PUSCHs within at least one CG occasion; and
    receive a plurality of packets across the plurality of PUSCHs within the at least one CG occasion for the UE based on the modified property, wherein the configuration indicates a periodicity based on a frames-per-second (fps) that characterizes traffic associated with the plurality of packets.

12. The apparatus of claim 11,
    wherein each PUSCH of the plurality of PUSCHs is associated with a corresponding modulation and coding scheme and a corresponding quantity of resource blocks.

13. The apparatus of claim 11,
    wherein the one or more processors are further configured to:
    transmit a configuration associated with a dynamic grant (DG) for retransmitting one or more packets of the plurality of packets; and
    receive the one or more packets according to the DG.

14. The apparatus of claim 11,
    wherein each CG occasion is associated with a maximum quantity of PUSCHs.

15. The apparatus of claim 11,
    wherein the one or more processors are further configured to receive an indication associated with skipping one or more other PUSCHs of the plurality of PUSCHs within the at least one CG occasion.

16. The apparatus of claim 11,
    wherein the one or more processors are further configured to:
    receive a second request associated with adding one or more additional PUSCHs within the at least one CG occasion;
    transmit an approval of the second request; and
    receive during the one or more additional PUSCHs.

17. The apparatus of claim 11,
    wherein the one or more processors are further configured to:
    transmit an approval of the request.

18. The apparatus of claim 11,
    wherein the one or more processors are further configured to receive a second request for the configuration based, at least in part, on one or more traffic statistics associated with the plurality of packets.

19. A method of wireless communication performed by a user equipment (UE), comprising:
    receiving a configuration associated with a configured grant (CG) that indicates a plurality of physical uplink shared channels (PUSCHs) within each CG occasion for the UE;

transmitting a request associated with modifying a property of one or more PUSCHs of the plurality of PUSCHs within at least one CG occasion; and transmitting a plurality of packets across the plurality of PUSCHs within the at least one CG occasion for the UE based on the modified property, wherein the configuration indicates a periodicity based on a frames-per-second (fps) that characterizes traffic associated with the plurality of packets.

20. The method of claim 19, further comprising:

receiving a configuration associated with a dynamic grant (DG) for retransmitting one or more packets of the plurality of packets; and retransmitting the one or more packets according to the DG.

21. The method of claim 19, wherein each PUSCH of the plurality of PUSCHs is associated with a corresponding modulation and coding scheme and a corresponding quantity of resource blocks.

22. The method of claim 19, further comprising:

transmitting an indication associated with skipping one or more other PUSCHs of the plurality of PUSCHs within the at least one CG occasion; and refraining from transmitting during the one or more other PUSCHs.

23. The method of claim 19, further comprising:

transmitting a second request associated with adding one or more additional PUSCHs within the at least one CG occasion;

receiving an approval of the second request; and transmitting during the one or more additional PUSCHs.

24. The method of claim 19, further comprising:

receiving an approval of the request.

25. The method of claim 19, further comprising transmitting a second request for the configuration based, at least in part, on one or more traffic statistics associated with the plurality of packets.

26. A method of wireless communication performed by a network entity, comprising:

transmitting a configuration associated with a configured grant (CG) that indicates a plurality of physical uplink shared channels (PUSCHs) within each CG occasion for a user equipment (UE);

receiving a request associated with modifying a property of one or more PUSCHs of the plurality of PUSCHs within at least one CG occasion; and receiving a plurality of packets across the plurality of PUSCHs within the at least one CG occasion for the UE based on the modified property, wherein the configuration indicates a periodicity based on a frames-per-second (fps) that characterizes traffic associated with the plurality of packets.

27. The method of claim 26, wherein each PUSCH of the plurality of PUSCHs is associated with a corresponding modulation and coding scheme and a corresponding quantity of resource blocks.

28. The method of claim 26, further comprising receiving an indication associated with skipping one or more other PUSCHs of the plurality of PUSCHs within the at least one CG occasion.

29. The method of claim 26, further comprising:

receiving a second request associated with adding one or more additional PUSCHs within the at least one CG occasion;

transmitting an approval of the second request; and receiving during the one or more additional PUSCHs.

30. The method of claim 26, further comprising:

transmitting an approval of the request.

\* \* \* \* \*